United States Patent
Gao et al.

(10) Patent No.: US 12,429,698 B2
(45) Date of Patent: Sep. 30, 2025

(54) EYE-IMAGING APPARATUS USING DIFFRACTIVE OPTICAL ELEMENTS

(71) Applicant: Magic Leap, Inc., Plantation, FL (US)

(72) Inventors: Chunyu Gao, Plantation, FL (US);
Chulwoo Oh, Sammamish, WA (US);
Michael Anthony Klug, Austin, TX (US); Evyatar Bluzer, Yuvalim (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/748,804

(22) Filed: Jun. 20, 2024

(65) Prior Publication Data

US 2024/0337850 A1     Oct. 10, 2024

Related U.S. Application Data

(63) Continuation of application No. 18/342,451, filed on Jun. 27, 2023, now Pat. No. 12,055,726, which is a
(Continued)

(51) Int. Cl.
*G02B 27/01*    (2006.01)
*F21V 8/00*    (2006.01)
(Continued)

(52) U.S. Cl.
CPC ..... *G02B 27/0172* (2013.01); *G02B 27/0093* (2013.01); *G02B 27/0179* (2013.01);
(Continued)

(58) Field of Classification Search
CPC ............ G02B 27/0172; G02B 27/0093; G02B 27/0179; G02B 6/0076; G02B 2027/0123;
(Continued)

(56) References Cited

U.S. PATENT DOCUMENTS

| 4,693,544 A | 9/1987 | Yamasaki et al. |
| 4,991,924 A | 2/1991 | Shankar et al. |

(Continued)

FOREIGN PATENT DOCUMENTS

| CA | 2995978 A1 * | 2/2017 | ........... H04N 13/398 |
| CA | 3011637 A1 * | 7/2017 | .............. G06F 3/011 |

(Continued)

OTHER PUBLICATIONS

Aieta et al., "Multiwavelength achromatic metasurfaces by dispersive phase compensation," Science, 2015, 347(6228):1342-1345, 8 pages.

(Continued)

*Primary Examiner* — Kwin Xie
(74) *Attorney, Agent, or Firm* — Fish & Richardson P.C.

(57) ABSTRACT

Examples of eye-imaging apparatus using diffractive optical elements are provided. For example, an optical device comprises a substrate having a proximal surface and a distal surface, a first coupling optical element disposed on one of the proximal and distal surfaces of the substrate, and a second coupling optical element disposed on one of the proximal and distal surfaces of the substrate and offset from the first coupling optical element. The first coupling optical element can be configured to deflect light at an angle to totally internally reflect (TIR) the light between the proximal and distal surfaces and toward the second coupling optical element, and the second coupling optical element can be configured to deflect at an angle out of the substrate. The eye-imaging apparatus can be used in a head-mounted display such as an augmented or virtual reality display.

17 Claims, 22 Drawing Sheets

Related U.S. Application Data continuation of application No. 17/385,554, filed on Jul. 26, 2021, now Pat. No. 11,754,840, which is a continuation of application No. 15/925,505, filed on Mar. 19, 2018, now Pat. No. 11,073,695.

(60) Provisional application No. 62/474,419, filed on Mar. 21, 2017.

(51) Int. Cl.
*G02B 27/00* (2006.01)
*G06T 19/00* (2011.01)
*H04N 13/332* (2018.01)
*H04N 13/344* (2018.01)
*H04N 13/383* (2018.01)

(52) U.S. Cl.
CPC ......... *G06T 19/006* (2013.01); *H04N 13/332* (2018.05); *H04N 13/344* (2018.05); *H04N 13/383* (2018.05); *G02B 6/0076* (2013.01); *G02B 2027/0123* (2013.01); *G02B 2027/0127* (2013.01); *G02B 2027/0134* (2013.01); *G02B 2027/0138* (2013.01); *G02B 2027/0178* (2013.01); *G02B 2027/0185* (2013.01); *G02B 2027/0187* (2013.01); *H04N 2213/001* (2013.01)

(58) Field of Classification Search
CPC .... G02B 2027/0127; G02B 2027/0134; G02B 2027/0138; G02B 2027/0178; G02B 2027/0185; G02B 2027/0187; H04N 13/332; H04N 13/383; H04N 13/344; H04N 2213/001; G06T 19/006
USPC .......................................................... 345/8
See application file for complete search history.

(56) References Cited

U.S. PATENT DOCUMENTS

| | | |
|---|---|---|
| 5,187,372 A | 2/1993 | Clube |
| 5,544,268 A | 8/1996 | Bishel et al. |
| 5,566,982 A | 10/1996 | Lehureau et al. |
| 5,592,314 A | 1/1997 | Ogasawara et al. |
| 5,808,797 A | 9/1998 | Bloom et al. |
| 5,825,448 A | 10/1998 | Bos et al. |
| 5,915,051 A | 6/1999 | Damask et al. |
| 6,014,197 A | 1/2000 | Hikmet |
| 6,028,656 A | 2/2000 | Buhrer et al. |
| 6,040,885 A | 3/2000 | Koike et al. |
| 6,181,393 B1 | 1/2001 | Enomoto et al. |
| 6,185,015 B1 | 2/2001 | Reinhorn et al. |
| 6,188,462 B1 | 2/2001 | Lavrentovich et al. |
| 6,334,960 B1 | 1/2002 | Willson et al. |
| 6,380,767 B1 | 4/2002 | Nyu et al. |
| 6,390,845 B1 | 5/2002 | Brady |
| 6,476,639 B2 | 11/2002 | Kousai et al. |
| 6,542,671 B1 | 4/2003 | Ma et al. |
| 6,680,767 B2 | 1/2004 | Coates et al. |
| 6,690,845 B1 | 2/2004 | Yoshimura et al. |
| 6,735,224 B2 | 5/2004 | Murry et al. |
| 6,750,941 B2 | 6/2004 | Satoh et al. |
| 6,850,221 B1 | 2/2005 | Tickle |
| 6,873,087 B1 | 3/2005 | Choi et al. |
| 6,900,881 B2 | 5/2005 | Sreenivasan et al. |
| 6,982,818 B2 | 1/2006 | Riza et al. |
| D514,570 S | 2/2006 | Ohta |
| 7,023,466 B2 | 4/2006 | Favalora et al. |
| 7,070,405 B2 | 7/2006 | Sreenivasan et al. |
| 7,098,572 B2 | 8/2006 | Choi et al. |
| 7,122,482 B2 | 10/2006 | Xu et al. |
| 7,140,861 B2 | 11/2006 | Watts et al. |
| 7,206,107 B2 | 4/2007 | Levola |
| 7,341,348 B2 | 3/2008 | Eagan |
| 7,375,784 B2 | 5/2008 | Smith et al. |
| 7,471,362 B1 | 12/2008 | Jones |
| 7,519,096 B2 | 4/2009 | Bouma et al. |
| 7,573,640 B2 | 8/2009 | Nivon et al. |
| 7,692,759 B2 | 4/2010 | Escuti et al. |
| 7,705,943 B2 | 4/2010 | Kume et al. |
| 8,064,035 B2 | 11/2011 | Escuti et al. |
| 8,076,386 B2 | 12/2011 | Xu et al. |
| 8,160,411 B2 | 4/2012 | Levola et al. |
| 8,233,204 B1 | 7/2012 | Robbins et al. |
| 8,248,458 B2 | 8/2012 | Schowengerdt et al. |
| 8,264,623 B2 | 9/2012 | Marrucci |
| 8,339,566 B2 | 12/2012 | Escuti et al. |
| 8,508,848 B2 | 8/2013 | Saarikko |
| 8,757,812 B2 | 6/2014 | Melville et al. |
| 8,885,161 B2 | 11/2014 | Scheeline et al. |
| 8,885,997 B2 | 11/2014 | Nguyen et al. |
| 8,950,867 B2 | 2/2015 | Macnamara |
| 9,081,426 B2 | 7/2015 | Armstrong |
| 9,195,092 B2 | 11/2015 | Escuti et al. |
| 9,215,293 B2 | 12/2015 | Miller |
| D752,529 S | 3/2016 | Loretan et al. |
| 9,310,559 B2 | 4/2016 | Macnamara |
| 9,345,402 B2 | 5/2016 | Gao |
| 9,348,143 B2 | 5/2016 | Gao et al. |
| D758,367 S | 6/2016 | Natsume |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,575,366 B2 | 2/2017 | Srivastava et al. |
| 9,664,905 B2 | 5/2017 | Bohn et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,933,684 B2 | 4/2018 | Brown et al. |
| 10,025,160 B2 | 7/2018 | Park et al. |
| 10,156,725 B2 | 12/2018 | TeKolste et al. |
| 10,191,288 B2 | 1/2019 | Singer et al. |
| 10,254,454 B2 | 4/2019 | Klug et al. |
| 10,260,864 B2 | 4/2019 | Edwin et al. |
| 10,261,318 B2 | 4/2019 | TeKolste et al. |
| 10,345,592 B2 | 7/2019 | Samec et al. |
| 10,432,920 B2 * | 10/2019 | Benitez ............. G02B 27/0172 |
| 10,466,478 B2 | 11/2019 | Klug et al. |
| 10,466,561 B2 | 11/2019 | Oh |
| 10,690,826 B2 | 6/2020 | Klug et al. |
| 11,073,695 B2 | 7/2021 | Gao et al. |
| 11,256,153 B2 | 2/2022 | Oh |
| 2002/0097962 A1 | 7/2002 | Yoshimura et al. |
| 2002/0126249 A1 | 9/2002 | Liang et al. |
| 2002/0131694 A1 | 9/2002 | So et al. |
| 2002/0167638 A1 | 11/2002 | Byun et al. |
| 2002/0172237 A1 | 11/2002 | Murry et al. |
| 2003/0147112 A1 | 8/2003 | Mukawa |
| 2003/0161573 A1 | 8/2003 | Ishida |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0150141 A1 | 8/2004 | Chao et al. |
| 2004/0184163 A1 | 9/2004 | Nishioka et al. |
| 2004/0191429 A1 | 9/2004 | Patrick |
| 2005/0002611 A1 | 1/2005 | Levola |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2005/0271325 A1 | 12/2005 | Anderson et al. |
| 2006/0017876 A1 | 1/2006 | Watts |
| 2006/0028436 A1 | 2/2006 | Armstrong |

(56) References Cited

U.S. PATENT DOCUMENTS

| | | |
|---|---|---|
| 2006/0055858 A1 | 3/2006 | Nakanishi et al. |
| 2006/0120247 A1 | 6/2006 | Noda et al. |
| 2006/0121358 A1 | 6/2006 | Rich et al. |
| 2006/0126179 A1 | 6/2006 | Levola |
| 2006/0146251 A1 | 7/2006 | Choi |
| 2006/0157443 A1 | 7/2006 | Mei |
| 2006/0221448 A1 | 10/2006 | Nivon et al. |
| 2006/0227283 A1 | 10/2006 | Ooi et al. |
| 2007/0031097 A1 | 2/2007 | Heikenfeld et al. |
| 2007/0081123 A1 | 4/2007 | Lewis |
| 2007/0229955 A1 | 10/2007 | Kawamura et al. |
| 2007/0273957 A1 | 11/2007 | Zalevsky et al. |
| 2008/0043166 A1 | 2/2008 | Liu et al. |
| 2008/0043334 A1 | 2/2008 | Itzkovitch et al. |
| 2008/0169479 A1 | 7/2008 | Xu et al. |
| 2009/0141216 A1 | 6/2009 | Marrucci |
| 2010/0142570 A1 | 6/2010 | Konttinen et al. |
| 2010/0157400 A1 | 6/2010 | Dimov et al. |
| 2010/0177388 A1 | 7/2010 | Cohen et al. |
| 2010/0207964 A1 | 8/2010 | Kimmel et al. |
| 2010/0225876 A1 | 9/2010 | Escuti et al. |
| 2010/0252960 A1 | 10/2010 | Iosad et al. |
| 2010/0277803 A1 | 11/2010 | Pockett et al. |
| 2010/0284090 A1 | 11/2010 | Simmonds |
| 2010/0321781 A1 | 12/2010 | Levola et al. |
| 2011/0002143 A1 | 1/2011 | Saarikko et al. |
| 2011/0007277 A1* | 1/2011 | Solomon .............. H04N 13/344 353/30 |
| 2011/0024950 A1 | 2/2011 | Kruglick |
| 2011/0049761 A1 | 3/2011 | Mataki |
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2012/0021140 A1 | 1/2012 | Dijksman et al. |
| 2012/0033306 A1 | 2/2012 | Valera et al. |
| 2012/0069232 A1 | 3/2012 | Chui et al. |
| 2012/0123074 A1 | 5/2012 | Okada |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0327330 A1 | 12/2012 | Takahashi et al. |
| 2013/0051730 A1 | 2/2013 | Travers et al. |
| 2013/0082922 A1 | 4/2013 | Miller |
| 2013/0093969 A1 | 4/2013 | Li et al. |
| 2013/0117377 A1 | 5/2013 | Miller |
| 2013/0125027 A1 | 5/2013 | Abovitz |
| 2013/0208234 A1 | 8/2013 | Lewis |
| 2013/0222384 A1 | 8/2013 | Futterer |
| 2013/0235191 A1 | 9/2013 | Miao et al. |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0278631 A1* | 10/2013 | Border ................ G06F 3/04842 345/633 |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0140653 A1 | 5/2014 | Brown et al. |
| 2014/0140654 A1* | 5/2014 | Brown ................ G02B 27/4272 385/10 |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt |
| 2014/0285429 A1* | 9/2014 | Simmons ........... G02B 27/0179 359/259 |
| 2014/0300695 A1 | 10/2014 | Smalley et al. |
| 2014/0306866 A1 | 10/2014 | Miller et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0241705 A1 | 8/2015 | Abovitz et al. |
| 2015/0243068 A1* | 8/2015 | Solomon .............. G02B 27/017 345/419 |
| 2015/0268415 A1 | 9/2015 | Schowengerdt et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0338660 A1* | 11/2015 | Mukawa .............. G02B 27/017 359/13 |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0018639 A1 | 1/2016 | Spitzer et al. |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041385 A1 | 2/2016 | Gotoh et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0131823 A1* | 5/2016 | Woodgate ............ G02B 6/0076 362/613 |
| 2016/0131947 A1 | 5/2016 | Park et al. |
| 2016/0167422 A1 | 6/2016 | Brehm et al. |
| 2016/0170268 A1 | 6/2016 | Song et al. |
| 2016/0187554 A1 | 6/2016 | Lee et al. |
| 2016/0209560 A1 | 7/2016 | Tabirian et al. |
| 2016/0209648 A1 | 7/2016 | Haddick et al. |
| 2016/0270656 A1 | 9/2016 | Samec et al. |
| 2016/0282808 A1 | 9/2016 | Smalley |
| 2016/0290657 A1 | 10/2016 | Lomicka et al. |
| 2016/0320536 A1 | 11/2016 | Simmonds et al. |
| 2016/0349517 A1 | 12/2016 | Miyasaka et al. |
| 2016/0370583 A1 | 12/2016 | Saarikko et al. |
| 2017/0010466 A1 | 1/2017 | Klug et al. |
| 2017/0082858 A1 | 3/2017 | Klug et al. |
| 2017/0131595 A1 | 5/2017 | Yim et al. |
| 2017/0184857 A1* | 6/2017 | Ato ...................... G02F 1/0121 |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0113309 A1 | 4/2018 | Robbins et al. |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164645 A1 | 6/2018 | Oh |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0239177 A1 | 8/2018 | Oh |
| 2018/0275350 A1 | 9/2018 | Oh |
| 2018/0275409 A1 | 9/2018 | Gao |
| 2018/0321496 A1 | 11/2018 | Bohn |
| 2019/0033684 A1 | 1/2019 | Favalora et al. |

(56) References Cited

U.S. PATENT DOCUMENTS

| | | |
|---|---|---|
| 2019/0086674 A1 | 3/2019 | Sinay et al. |
| 2019/0121142 A1 | 4/2019 | Tekolste |
| 2019/0227211 A1 | 7/2019 | Klug et al. |
| 2019/0243141 A1 | 8/2019 | Tekolste |
| 2019/0243142 A1 | 8/2019 | Tekolste |
| 2019/0371028 A1* | 12/2019 | Harrises ............ G02B 27/0101 |
| 2020/0174304 A1 | 6/2020 | Oh |
| 2021/0294146 A1 | 9/2021 | Oh |

FOREIGN PATENT DOCUMENTS

| | | | |
|---|---|---|---|
| CN | 1637502 | 7/2005 | |
| CN | 101133348 | 2/2008 | |
| CN | 101655606 | 2/2010 | |
| CN | 102683803 | 9/2012 | |
| CN | 103823267 | 5/2014 | |
| CN | 104145208 | 11/2014 | |
| CN | 104536088 | 4/2015 | |
| CN | 105849621 | 8/2016 | |
| CN | 106125194 | 11/2016 | |
| CN | 106133569 | 11/2016 | |
| EP | 0132077 | 1/1985 | |
| EP | 0415735 | 3/1991 | |
| EP | 0549283 | 6/1993 | |
| EP | 2065750 | 6/2009 | |
| EP | 2664430 | 11/2013 | |
| EP | 3095026 B1 * | 4/2025 | ......... G06F 3/03545 |
| JP | 62-269174 | 11/1987 | |
| JP | 1991-084516 | 4/1991 | |
| JP | H07-270614 | 10/1995 | |
| JP | 2000056259 A | 2/2000 | |
| JP | 2000-075405 | 3/2000 | |
| JP | 2005-196117 | 7/2005 | |
| JP | 2005-316304 | 11/2005 | |
| JP | 2005-316314 | 11/2005 | |
| JP | 2007-219106 | 8/2007 | |
| JP | 2007-304227 | 11/2007 | |
| JP | 2008-058776 | 3/2008 | |
| JP | 2008058777 A | 3/2008 | |
| JP | 2008-209710 | 9/2008 | |
| JP | 2010-102215 | 5/2010 | |
| JP | 2010-525394 | 7/2010 | |
| JP | 2010-271565 | 12/2010 | |
| JP | 2013-200467 | 10/2013 | |
| JP | 2014-132328 | 7/2014 | |
| JP | 2014-528597 | 10/2014 | |
| JP | WO 2014/156167 | 10/2014 | |
| JP | 2014-224846 | 12/2014 | |
| JP | 2015-089638 | 5/2015 | |
| JP | 2015-118273 | 6/2015 | |
| JP | 2015-213226 | 11/2015 | |
| JP | 2017-522601 | 8/2017 | |
| WO | WO 1998/057236 | 12/1998 | |
| WO | WO 2005/024469 | 3/2005 | |
| WO | WO 2006/064301 | 6/2006 | |
| WO | WO 2006/092758 | 9/2006 | |
| WO | WO 2006/106501 | 10/2006 | |
| WO | WO 2008/130555 | 10/2008 | |
| WO | WO 2008/130561 | 10/2008 | |
| WO | WO 2010/067114 | 6/2010 | |
| WO | WO 2013/054115 | 4/2013 | |
| WO | WO 2014/016403 | 1/2014 | |
| WO | WO 2014/036537 | 3/2014 | |
| WO | WO 2014/080155 | 5/2014 | |
| WO | WO 2014/091204 | 6/2014 | |
| WO | WO 2014/172252 | 10/2014 | |
| WO | WO 2014/188149 | 11/2014 | |
| WO | WO 2015/012280 | 1/2015 | |
| WO | WO 2015/077718 | 5/2015 | |
| WO | WO 2015/081313 | 6/2015 | |
| WO | 2016046514 A1 | 3/2016 | |
| WO | WO 2016/054092 | 4/2016 | |
| WO | WO 2016/082031 | 6/2016 | |
| WO | WO 2016/113533 | 7/2016 | |
| WO | WO 2016/194961 | 12/2016 | |
| WO | WO 2016/205249 | 12/2016 | |
| WO | WO 2016/205256 | 12/2016 | |
| WO | WO 2017/134412 | 8/2017 | |
| WO | WO 2017/223121 | 12/2017 | |
| WO | WO 2018/093730 | 5/2018 | |
| WO | WO 2018/094079 | 5/2018 | |
| WO | WO 2018/094093 | 5/2018 | |
| WO | WO 2018/112101 | 6/2018 | |
| WO | WO 2018/156779 | 8/2018 | |
| WO | WO 2018/156784 | 8/2018 | |
| WO | WO 2018/175343 | 9/2018 | |
| WO | WO 2018/175488 | 9/2018 | |
| WO | WO 2019/060741 | 3/2019 | |
| WO | WO 2020/069026 | 4/2020 | |

OTHER PUBLICATIONS

Arbabi et al., "Dielectric metasurfaces for complete control of phase and polarization with subwavelength spatial resolution and high transmission," Nature Nanotechnology, Aug. 2015, 10:937-943, 8 pages.
ARToolKit: https://web.archive.org/web/20051013062315/http://www.hitl.washington.edu:80/artoolkit/docurnentation/hardware.htrn, archived Oct. 13, 2005, 3 pages.
Azuma, "Predictive Tracking for Augmented Realty," TR95-007, Department of Computer Science, UNC-Chapel Hill, NC, Feb. 1995, 262 pages.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Bimber, et al., "Spatial Augmented Reality—Merging Real and Virtual Worlds," 2005, https://web.media.mit.edu/~raskar/book/BirnberRaskarAugmentedRealityBook.pdf, 393 pages.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Chiu et al., "P-33: Large Area Self-aligning of Liquid Crystal Molecules induced by Nanoimprinting Lithography and a Multiple Function Film Made Therein," Paper, Presented at Proceedings of the Second Americas Display Engineering and Applications Conference, ADEAC 2005, Portland, OR, Sep. 20-22, 2020, 323-325.
Choi et al., "Determination of Surface Nematic Liquid Crystal Anchoring Strength Using Nano-scale Surface Grooves," Optical Society of America, May 2013, 21(10): 10 pages.
Crawford, et al.: "Liquid-crystal diffraction gratings using polarization holography alignment techniques," Journal of Applied Physics 98, 123102, 2005, 11 pages.
Cunningham et al., "A plastic colorimetric resonant optical biosensor for multiparallel detection of label-free biochemical interactions," Sensors and Actuators B, Jul. 2002, 85(3):219-226.
Dierking, I.: "Chiral Liquid Crystals: Structures, Pilases. Effects." Symmetry, (Jun. 2014) 6(2): 444-472.
Escuti, "P. 39.4: Polarization-Independent Modulation & Simplified Spectropolarimetry Using LC Polarization Gratings," Paper, Presented at Proceedings of paper #39.4, posters P-209, P-167, SID Symposium Digest. 2006, 1 page.
Escuti, M. et al., "39.4: Polarization-independent switching with high contrast from a liquid crystal polarization grating," SID Symposium Digest, vol. 37, pp. 1443-1446, Jun. 2006, in 5 pages.
Escuti, M. et al., Polarization-Independent LC Microdisplays Using Liquid Crystal Polarization Gratings: A Viable Solution, ILCC presentation, Jul. 1, 2008, in 15 pages.
Gear et al., "Engineered Liquid Crystal Anchoring Energies with nanopatterned Surfaces," Optical Society of America. Jan. 2015, 23:807-814, 8 pages.
International Preliminary Report on Patentability for PCT Application No. PCT/US18/23178, issued Sep. 24, 2019, 9 pages.
International Preliminary Report on Patentability for PCT Application No. PCT/US2017/062083, issued May 21, 2019, 9 pages.
International Preliminary Report on Patentability for PCT Application No. PCT/US2017/065182, issued Jun. 11, 2019, 5 pages.

(56) References Cited

OTHER PUBLICATIONS

International Search Report and Written Opinion for PCT Application No. PCT/US18/019257, mailed Jul. 2, 2018, 10 pages.
International Search Report and Written Opinion for PCT Application No. PCT/US18/23178, mailed Aug. 3, 2018, 19 pages.
International Search Report and Written Opinion for PCT Application No. PCT/US2017/062063, mailed Jan. 25, 2018, 10 pages.
International Search Report and Written Opinion for PCT Application No. PCT/US2017/062083, mailed Mar. 19, 2018, 14 pages.
International Search Report and Written Opinion for PCT Application No. PCT/US2017/065182, mailed Apr. 6, 2018, 9 pages.
International Search Report and Written Opinion for PCT Application No. PCT/US2018/019250, mailed Jun. 29, 2018, 14 pages.
International Search Report and Written Opinion for PCT Application No. PCT/US2018/023425, mailed Jun. 22, 2018, 18 pages.
Invitation to Pay Additional Fees And, Where Applicable, Protest Fee for PCT Application No. PCT/US2017/065182, dated Feb. 14, 2018, 3 pages.
Invitation to Pay Additional Fees And, Where Applicable, Protest Fee for PCT Application No. PCT/US2018/019250, mailed May 2, 2018, 2 pages.
Invitation to Pay Additional Fees And, Where Applicable, Protest Fee for PCT Application No. PCT/US2018/019257, mailed May 3, 2018, 2 pages.
Invitation to Pay Additional Fees And. Where Applicable, Protest Fee for PCT Application No. PCT/US18/23178, mailed Jun. 4, 2018, 2 pages.
Invitation to Pay Additional Fees for PCT Application No. PCT/US2017/062083, mailed Jan. 19, 2018, 2 pages.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Kim et al., "Paper: Wide-angle, nonmechanical beam steering using thin liquid crystal polarization gratings," Paper, Presented at Proceedings of SPIE Optical Engineering + Applications, San Diego, California, Aug. 10-14, 2008, 7093:709302-1709302-12.
Kim, J. et al., "Wide-angle, nonmechanical beam steering with high throughput utilizing polarization gratings," Applied Optics, vol. 50, No. 17, Jun. 10, 2011, in 4 pages.
Komanduri, et al., "Multi-twist retarders: broadband retardation control using self-aligning reactive liquid crystal layers," Optical Society of America, Optics Express 404, vol. 21, No. 1, Jan. 14, 2013, 17 pages.
Komanduri, R et al., "Polarization Independent Projection Systems using nlin Film Polymer Polarization Gratings and Standard Liquid Crystal Microdisplays," SID-Display week presentation, Jun. 3, 2009, in 12 pages.
Komanduri, R et al., "18:3: Late-News Paper: Polarization Independent Liquid Crystal Microdisplays," SID Digest, vol. 39, No. 1, pp. 236-239. May 2008, in 4 pages.
Komanduri, R. et al., "34.4L: Late-News Paper: Polarization Independent Projection Systems using Thin Film Polymer Polarization Gratings and Standard Liquid Crystal Microdisplays," SID Digest, vol. 40, No. 1, Jun. 2009, in 4 pages.
Komanduri, R. et al., "Elastic Continuum Analysis of the Liquid Crystal Polarization Grating," Physical review. E, Statistical, nonlinear, and soft matter physics, May 25, 2007, in 8 pages.
Komanduri, R. et al., "Polarization-independent modulation for projection displays using small-period LC polarization gratings," Journal of the Society for information display, vol. 15, No. 8, pp. 589-594, Aug. 2007, in 7 pages.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al., Negative dispersion of birefringence in two-dimensionally self-organized smectic liquid crystal and monomer thin film, Optics Letters, vol. 39, No. 17, Sep. 1, 2014, 5 pages.
Lim, Y. et al., "Anisotropic Nano-Imprinting Technique tor Fabricating a Patterned Optical Film of a Liquid Crystalline Polymer," Journal of Nanoscience and Nanotechnology, vol. 8, pp. 4775-4778, Oct. 2008, in 4 pages.
Lin et al., "Dielectric gradient metasurface optical elements", Science, Jul. 2014, 345(6194):298-302.
Lin et al., "Molecular-Scale soft imprint lithography for alignment layers in liquid crystal devices," Nano Letters, May 2007, 7(6): 1613-1621.
Lin et al., "Supplementary Materials for Dielectric gradient metasurface optical elements," Science, vol. 345, Issue 6194, Jul. 18, 2014, in 22 pages.
Lub J. et al., "Formation of Optical Films by Photo-Polymerisation of Liquid Crystalline Acrylates and Application of These Films in Liquid Crystal Display Technology," Mol Cryst Liq Cryst., (May 2005) 429(1 ):77-99.
Metamaterials.duke.edu [online], "Metamaterials," available on or before May 11, 2015, via Internet Archive: Wayback Machine URL <http://web.archive.org/web/20150511045547/http://metamaterials.duke.edu/research/metamaterials>, retrieved on Aug. 12, 2016, URL <http://metamaterials.duke.edu/research/metamaterials>, 3 pages.
Nikolova et al., "Diffraction Efficiency and Selectivity of Polarization Holographic Recording," Optica Acta: Int'l J Optics (1984) 31 (5):579-588.
Office Action in Chinese Appln. No. 201880032816.9, dated Jan. 12, 2022, 18 pages (with English translation).
Office Action in European Appln. No. 18771246.8, dated May 12, 2023, 5 pages.
Office Action in Japanese Appln. No. 2019-551398, dated Feb. 24, 2022, 13 pages (with English translation).
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate," N.C. State University, Electrical Engineering (2009) in 190 pages.
Oh et al., "Polarization-Independent Modulation Using Standard Liquid Crystal Microdisplays and Polymer Polarization Gratings," NC State University; International Display Research Conference, 2008, 28:298-301, 16 pages.
Oh, C. et al., "Numerical analysis of polarization gratings using the finite-difference time-domain method," Physical review A, vol. 76, Oct. 12, 2007, in 8 pages.
Oh, C. et al., "Polarization-Independent Modulation using Standard LCDs and Polymer PGs," 2008, in 6 pages.
Oh, C. et al., 16.2: Polarization-Independent Modulation Using Standard Liquid Crystal Microdisplays and Polymer Polarization Gratings, IDRC, 2008, in 4 pages.
Scheeline, et al., "Stacked Mutually Rotated Diffraction Gratings as Enablers of Portable Visible Spectrometry," Appl. Spectrosc. 70, 766-777, May 11, 2016.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Weng et al., "Polarization vol. grating with high efficiency and large diffraction angle," Optics Express, Aug. 2016, 24(16):17746-17759.
Wikipedia Blind spot (vision), archived Jun. 9, 2016, in 2 pages. URL: https://web.archive.org/web/20160609224858/https:en.wikipedia.org/wiki/Blind_spot(vision).
Yang et al., "Negative dispersion of birefringence of smectic liquid crystal-polymer compostie: dependence on the constituent molecules and temperature," Optical Society of America, Optics Express 2466, Feb. 2015, 23(3):2466-2471.
Yu et al., "Flat optics with designer metasurfaces," Nature Materials, Feb. 2014, 13:139-150.
Yu et al., "Light Propagation with Phase Discontinuities: Generalized Laws of Reflection and Refraction," Science, Oct. 2011, 334(333): 6 pages.

(56) References Cited

OTHER PUBLICATIONS

Office Action in Japanese Appln. No. 2024-074767, mailed on Mar. 5, 2025, 14 pages (with English translation).

\* cited by examiner

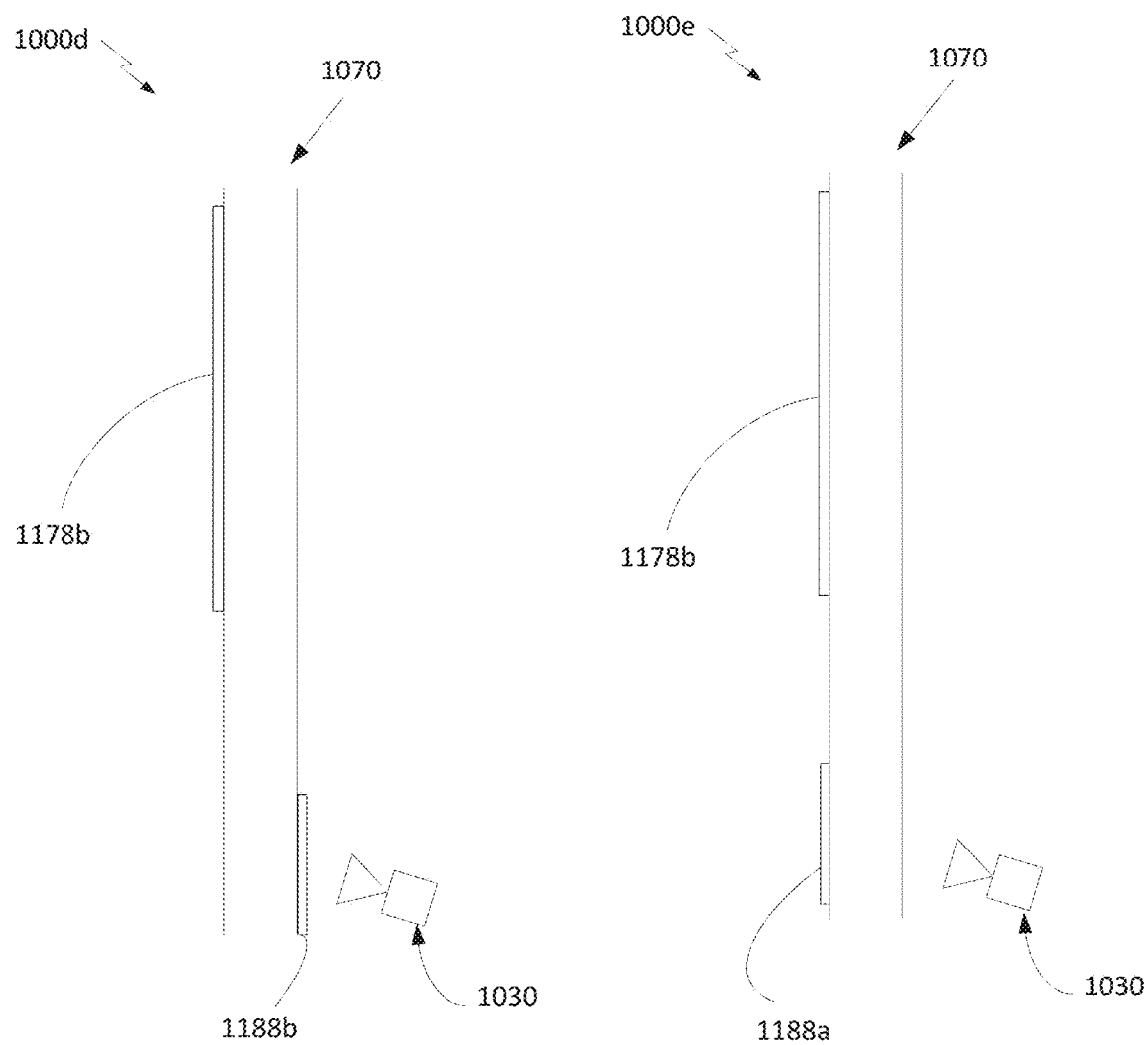

EYE-IMAGING APPARATUS USING DIFFRACTIVE OPTICAL ELEMENTS

CROSS-REFERENCE TO RELATED APPLICATIONS

This application is a continuation of U.S. application Ser. No. 18/342,451, filed Jun. 27, 2023, entitled "EYE-IMAGING APPARATUS USING DIFFRACTIVE OPTICAL ELEMENTS," which is a continuation of U.S. application Ser. No. 17/385,554, filed Jul. 26, 2021, entitled "EYE-IMAGING APPARATUS USING DIFFRACTIVE OPTICAL ELEMENTS," now U.S. Pat. No. 11,754,840, which is a continuation of U.S. application Ser. No. 15/925,505, filed Mar. 19, 2018, entitled "EYE-IMAGING APPARATUS USING DIFFRACTIVE OPTICAL ELEMENTS," now U.S. Pat. No. 11,073,695, which claims the benefit of priority to U.S. Provisional Patent Application No. 62/474,419, filed Mar. 21, 2017, entitled "EYE-IMAGING APPARATUS USING DIFFRACTIVE OPTICAL ELEMENTS," the contents of which are hereby incorporated by reference herein in their entirety.

FIELD

The present disclosure relates to virtual reality and augmented reality imaging and visualization systems and in particular to compact imaging systems for acquiring images of an eye using coupling optical elements to direct light to a camera assembly.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Various implementations of methods and apparatus within the scope of the appended claims each have several aspects, no single one of which is solely responsible for the desirable attributes described herein. Without limiting the scope of the appended claims, some prominent features are described herein.

One aspect of the present disclosure provides imaging an object with a camera assembly that does not directly view the object. Accordingly, optical devices according to embodiments described herein are configured to direct light from an object to an off-axis camera assembly so to capture an image of the object as if in a direct view position.

In some embodiments, systems, devices, and methods for acquiring an image of an object using an off-axis camera assembly are disclosed. In one implementation, an optical device is disclosed that may include a substrate having a proximal surface and a distal surface; a first coupling optical element disposed on one of the proximal and distal surfaces of the substrate; and a second coupling optical element disposed on one of the proximal and distal surfaces of the substrate and offset from the first coupling optical element. The first coupling optical element may be configured to deflect light at an angle to totally internally reflect (TIR) the light between the proximal and distal surfaces and toward the second coupling optical element. The second coupling optical element may be configured to deflect light at an angle out of the substrate. In some embodiments, at least one of the first and second coupling optical elements include a plurality of diffractive features.

In some embodiments, systems, devices, and methods for acquiring an image of an object using an off-axis camera assembly are disclosed. In one implementation, a head mounted display (HMD) configured to be worn on a head of a user is disclosed that may include a frame; a pair of optical elements supported by the frame such that each optical element of the pair of optical elements is capable of being disposed forward of an eye of the user; and an imaging system. The imaging system may include a camera assembly mounted to the frame; and an optical device for directing light to the camera assembly. The optical device may include a substrate having a proximal surface and a distal surface; a first coupling optical element disposed on one of the proximal and distal surfaces of the substrate; and a second coupling optical element disposed on one of the proximal and distal surfaces of the substrate and offset from the first coupling optical element. The first coupling optical element may be configured to deflect light at an angle to TIR the light between the proximal and distal surfaces and toward the second coupling optical element. The second coupling optical element may be configured to deflect light at an angle out of the substrate.

In some embodiments, systems, devices, and methods for acquiring an image of an object using an off-axis camera assembly are disclosed. In one implementation, an imaging system is disclosed that may include a substrate having a proximal surface and a distal surface. The substrate may include a first diffractive optical element disposed on one of the proximal and distal surfaces of the substrate, and a second diffractive optical element disposed on one of the proximal and distal surfaces of the substrate and offset from the first coupling optical element. The first diffractive optical element may be configured to deflect light at an angle to TIR the light between the proximal and distal surfaces and toward the second coupling optical element. The second diffractive optical element may be configured to deflect light incident thereon at an angle out of the substrate. The imaging system may also include a camera assembly to image the light deflected by the second coupling optical element. In some embodiments, the first and second diffractive optical elements comprise at least one of an off-axis diffractive optical element (DOE), an off-axis diffraction grating, an off-axis diffractive optical element (DOE), an off-axis holographic mirror (OAHM), or an off-axis volumetric diffractive optical element (OAVDOE), an off-axis cholesteric liquid crystal diffraction grating (OACLCG), a hot mirror, a prism, or a surface of a decorative lens.

In some embodiments, systems, devices, and methods for acquiring an image of an object using an off-axis camera assembly are disclosed. The method may include providing an imaging system in front of an object to be imaged. The imaging system may a substrate that may include a first coupling optical element and a second coupling optical element each disposed on one of a proximal surface and a distal surface of the substrate and offset from each other. The first coupling optical element may be configured to deflect light at an angle to TIR the light between the proximal and distal surfaces and toward the second coupling optical element. The second coupling optical element may be configured to deflect light at an angle out of the substrate. The method may also include capturing light with a camera assembly oriented to receive light deflected by the second coupling optical element, and producing an off-axis image of the object based on the captured light.

In any of the embodiments, the proximal surface and the distal surface of the substrate can, but need not, be parallel to each other. For example, the substrate may comprise a wedge.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 14A-18 schematically illustrate several example arrangements of imaging systems for imaging an object.

Figure 1:
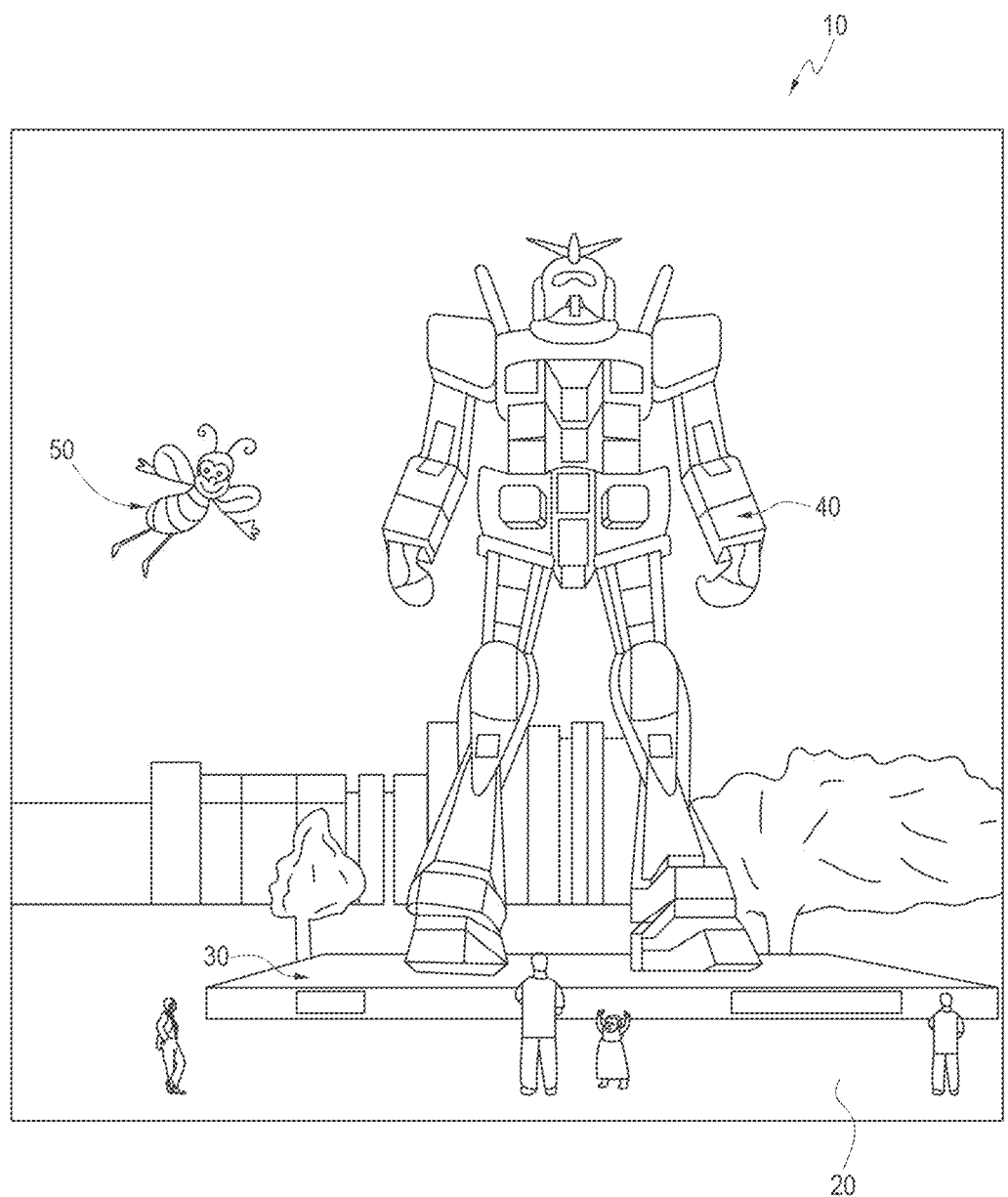
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A head mounted display (HMD) might use information about the state of the eyes of the wearer for a variety of purposes. For example, this information can be used for estimating the gaze direction of the wearer, for biometric identification, vision research, evaluate a physiological state of the wearer, etc. However, imaging the eyes can be challenging. The distance between the HMD and the wearer's eyes is short. Furthermore, gaze tracking requires a large field of view (FOV), while biometric identification requires a relatively high number of pixels on target on the iris. For imaging systems that seek to accomplish both of these objectives, these requirements are largely at odds. Furthermore, both problems may be further complicated by occlusion by the eyelids and eyelashes. Some current implementations for tracking eye movement use cameras mounted on the HMD and pointed directly toward the eye to capture direct images of the eye. However, in order to achieve the desired FOV and pixel number, the cameras are mounted within the wearer's FOV, thus tend to obstruct and interfere with the wearer's ability to see the surrounding world. Other implementations move the camera away from obstructing the wearer's view while directly imaging the eye, which results in imaging the eye from a high angle causing distortions of the image and reducing the field of view available for imaging the eye.

Embodiments of the imaging systems described herein address some or all of these problems. Various embodiments described herein provide apparatus and systems capable of imaging an eye while permitting the wearer to view the surrounding world. For example, an imaging system can comprise a substrate disposed along a line of sight between an eye and a camera assembly. The substrate includes one or more coupling optical elements configured to direct light from the eye into the substrate. The substrate may act as a light-guide (sometimes referred to as a waveguide) to direct light toward the camera assembly. The light may then exit the substrate and be directed to the camera assembly via one or more coupling optical elements. The camera assembly receives the light, thus is able to capture an image (sometimes referred to hereinafter as "direct view image") of the eye as if in a direct view position from a distant position (sometimes referred to herein as "off-axis").

Some embodiments of the imaging systems described herein provide for a substrate comprising a first and second coupling optical element laterally offset from each other. The substrate includes a surface that is closest to the eye (sometimes referred to herein as the proximal surface) and a surface that is furthest from the eye (sometimes referred to as the distal surface). The first and second coupling optical elements described herein can be disposed on or adjacent to the proximal surface, on or adjacent to the distal surface, or within the substrate. The first coupling optical element (sometimes referred to herein as an in-coupling optical element) can be configured to deflect light from the eye into the substrate such that the light propagates through the substrate by total internal reflection (TIR). The light may be incident on the second coupling optical element configured to extract the light and deflect it toward the camera assembly. As used herein, deflect may refer to a change in direction of light after interacting something, for example, an optical component that deflects light may refer to reflection, diffraction, refraction, a change in direction while transmitting through the optical component, etc.

In some embodiments, the imaging systems described herein may be a portion of display optics of an HMD (or a lens in a pair of eyeglasses). One or more coupling optical elements may be selected to deflect on a first range of wavelengths while permitting unhindered propagation of a second range of wavelengths (for example, a range of wavelengths different from the first range) through the substrate. The first range of wavelengths can be in the infrared (IR), and the second range of wavelengths can be in the visible. For example, the substrate can comprise a reflective coupling optical element, which reflects IR light while transmitting visible light. In effect, the imaging system acts as if there were a virtual camera assembly directed back toward the wearer's eye. Thus, virtual camera assembly can image virtual IR light propagated from the wearer's eye through the substrate, while visible light from the outside world can be transmitted through the substrate and can be perceived by the wearer.

The camera assembly may be configured to view an eye of a wearer, for example, to capture images of the eye. The camera assembly can be mounted in proximity to the wearer's eye such that the camera assembly does not obstruct the wearer's view of the surrounding world or imped the operation of the HMD. In some embodiments, the camera assembly can be positioned on a frame of a wearable display system, for example, an ear stem or embedded in the eyepiece of the HMD, or below the eye and over the check. In some embodiments, a second camera assembly can be used for the wearer's other eye so that each eye can be separately imaged. The camera assembly can include an IR digital camera sensitive to IR radiation.

The camera assembly can be mounted so that it is facing forward (in the direction of the wearer's vision) or it can be backward facing and directed toward the eye. In some embodiments, by disposing the camera assembly nearer the car of the wearer, the weight of the camera assembly may also be nearer the car, and the HMD may be easier to wear as compared to an HMD where the camera assembly is disposed nearer to the front of the HMD or in a direct view arrangement. Additionally, by placing the camera assembly near the wearer's temple, the distance from the wearer's eye to the camera assembly is roughly twice as large as compared to a camera assembly disposed near the front of the HMD. Since the depth of field of an image is roughly proportional to this distance, the depth of field for the camera assembly is roughly twice as large as compared to a direct view camera assembly. A larger depth of field for the camera assembly can be advantageous for imaging the eye region of wearers having large or protruding noses, brow ridges, etc. In some embodiments, the position of the camera assembly may be based on the packaging or design considerations of the HMD. For example, it may be advantageous to disposed the camera assembly as a backward or forward facing in some configurations.

Without subscribing to any particular scientific theory, the embodiments described herein may include several non-limiting advantages. Several embodiments are capable of increasing the physical distance between the camera assembly and the eye, which may facilitate positioning the camera assembly out of the field of view of the wearer's and therefore not obstructing the wearer's view while permitting capturing of an direct view image of the eye. Some of the embodiments described herein also may be configured to permit eye tracking using larger field of view than conventional systems thus allowing eye tracking over a wide range of positions. The use of IR imaging may facilitate imaging the eye with interfering with the wearer's ability to see through the substrate and view the environment.

Reference will now be made to the figures, in which like reference numerals refer to like parts throughout.

Example HMD Device

Figure 2:
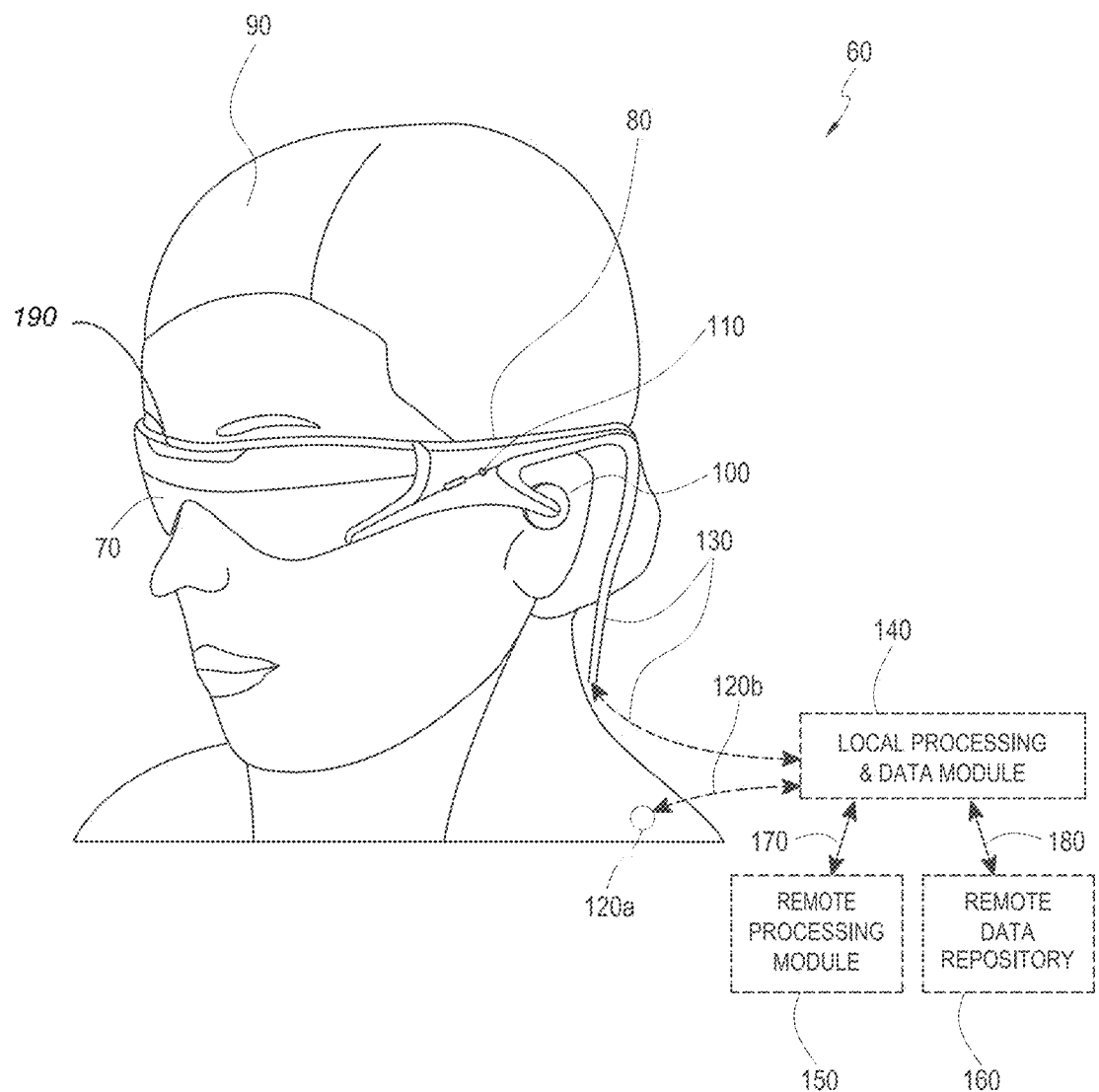
FIG. 2 illustrates an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the car canal of the user 90 (in some embodiments, another speaker, not shown, is positioned adjacent the other car canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing the physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data may include data a) captured from sensors (which may be, e.g., operatively coupled to the frame 80 or otherwise attached to the user 90), such as image capture devices (such as, for example, cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
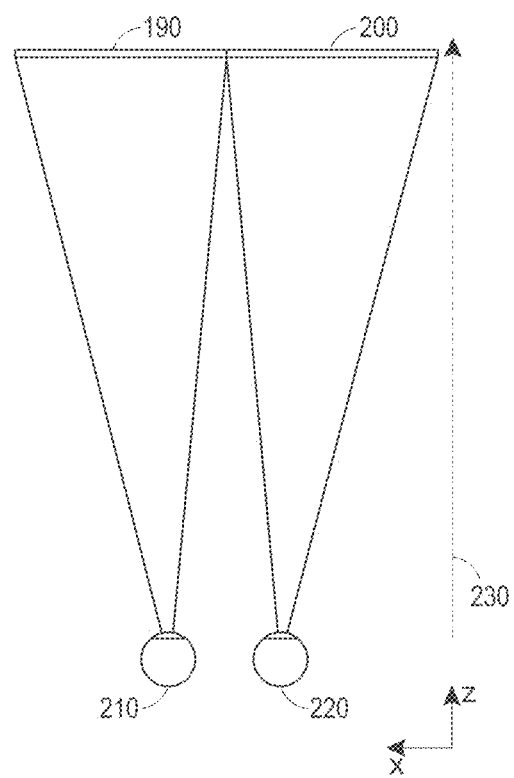
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (e.g., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
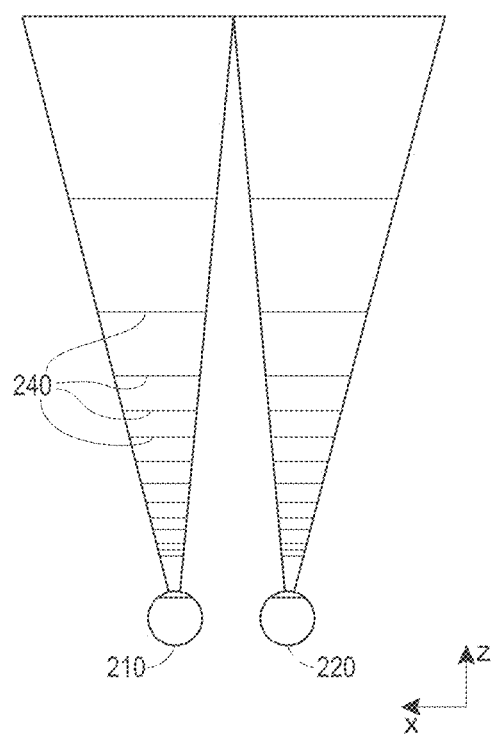
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
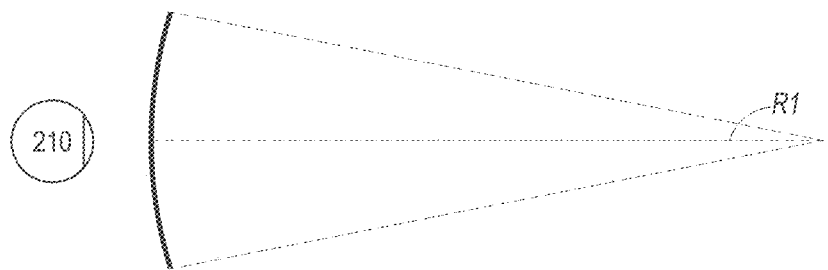
FIGS. 5A-5C illustrate relationships between radius of curvature and focal radius.
Figure 5B:
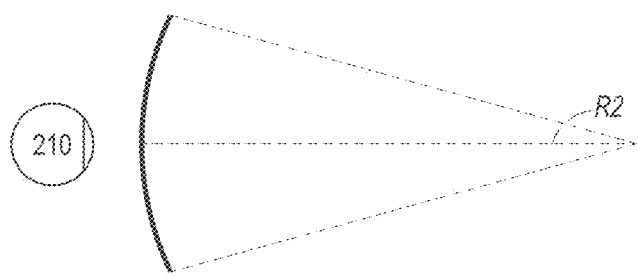
Figure 5C:
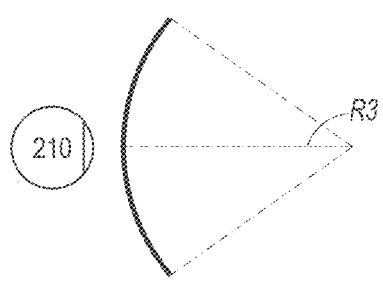

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Example of a Waveguide Stack Assembly

Figure 6:
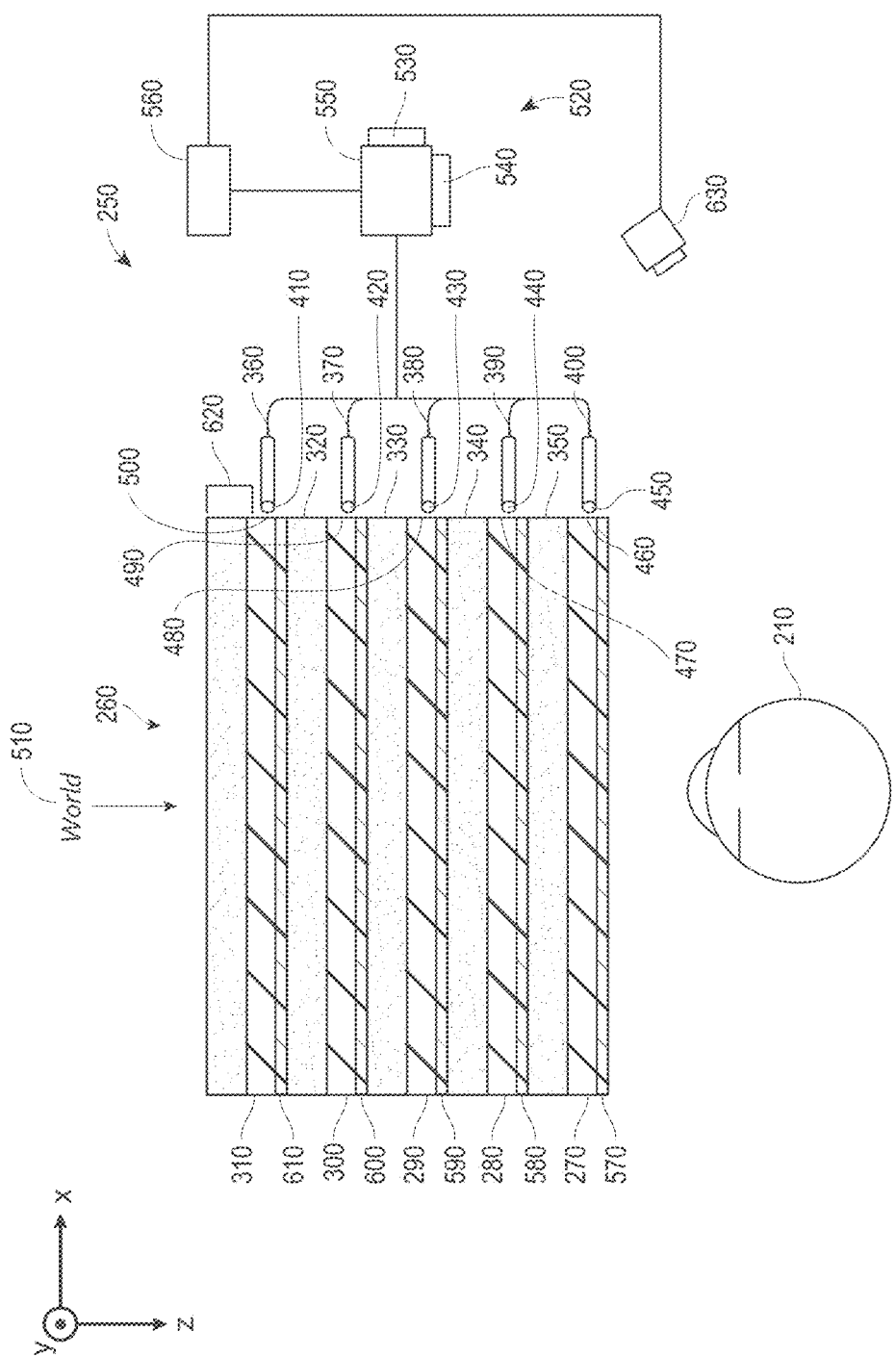
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, and 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by TIR. The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for case of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, e.g., detect user inputs, extract biometric information from the eye, estimate and track the gaze of the direction of the eye, to monitor the physiological state of the user, etc. As used herein, a camera may be any image capture device. In some embodiments, the camera assembly 630 may include an image capture device and a light source 632 to project light (e.g., IR or near-IR light) to the eye, which may then be reflected by the eye and detected by the image capture device. In some embodiments, the light source 632 includes light emitting diodes ("LEDs"), emitting in IR or near-IR. While the light source 632 is illustrated as attached to the camera assembly 630, it will be appreciated that the light source 632 may be disposed in other areas with respect to the camera assembly such that light emitted by the light source is directed to the eye of the wearer (e.g., light source 530 described below). In some embodiments, the camera assembly 630 may be attached to the frame 80 (FIG. 2) and may be in electrical communication with the processing modules 140 or 150, which may process image information from the camera assembly 630 to make various determinations regarding, e.g., the physiological state of the user, the gaze direction of the wearer, iris identification, etc., as discussed herein. It will be appreciated that information regarding the physiological state of user may be used to determine the behavioral or emotional state of the user. Examples of such information include movements of the user or facial expressions of the user. The behavioral or emotional state of the user may then be triangulated with collected environmental or virtual content data so as to determine relationships between the behavioral or emotional state, physiological state, and environmental or virtual content data. In some embodiments, one camera assembly 630 may be utilized for each eye, to separately monitor each eye.

Figure 7:
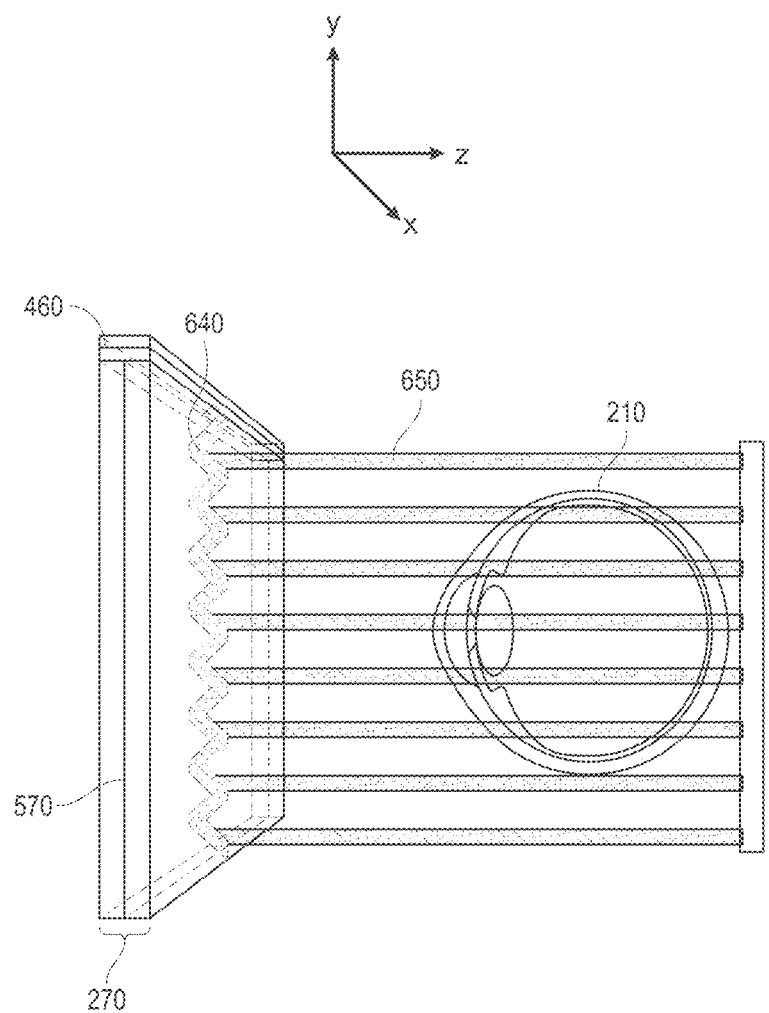
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. Substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
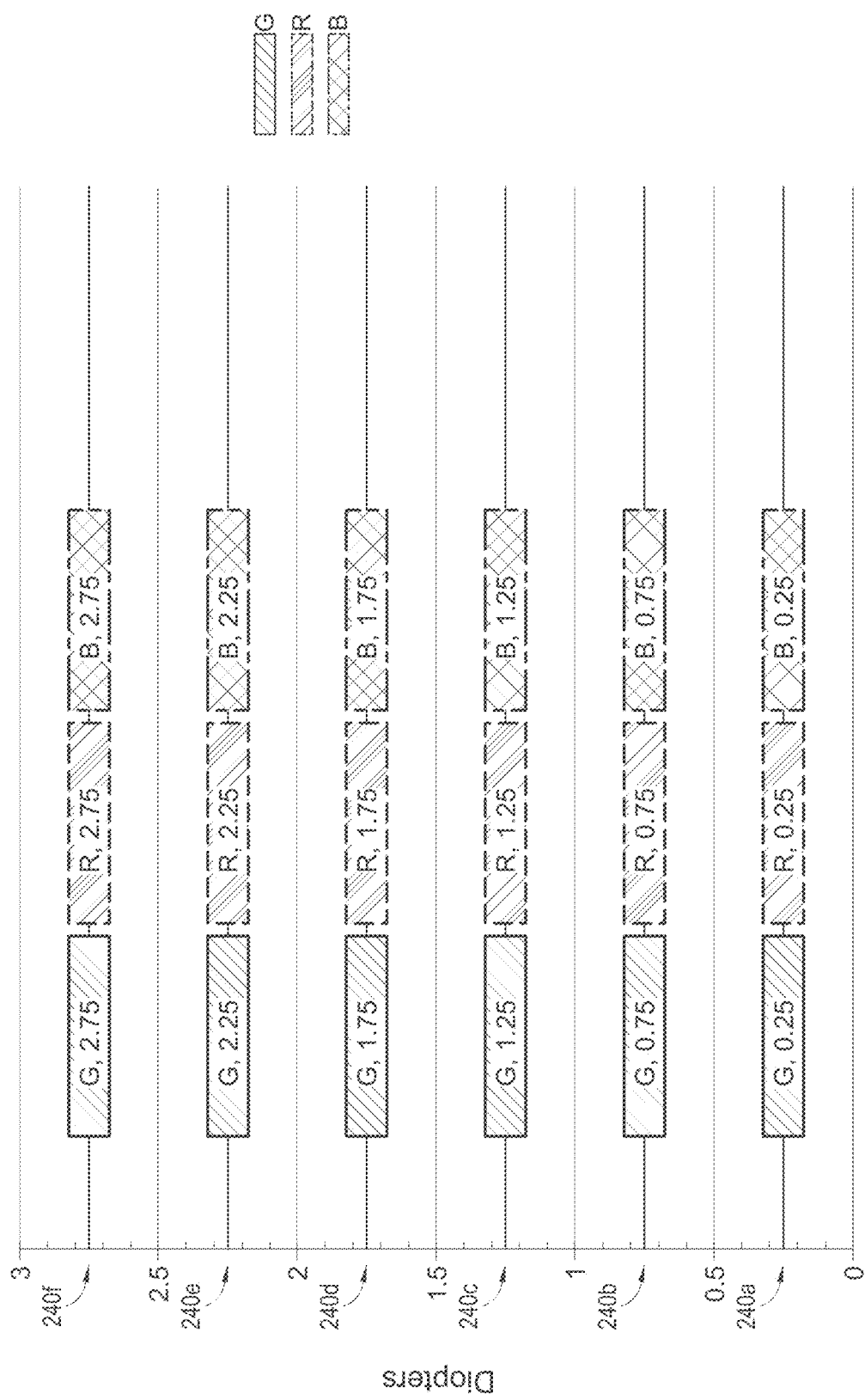
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively pass light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, IR or ultraviolet wavelengths. IR light can include light with wavelengths in a range from 700 nm to 10 μm. In some embodiments, IR light can include near-IR light with wavelengths in a range from 700 nm to 1.5 μm. In addition, the in-coupling, out-coupling, and other light redirecting structures of the waveguides of the display 250 may be configured to direct and emit this light out of the display towards the user's eye 210, e.g., for imaging or user stimulation applications.

Figure 9A:
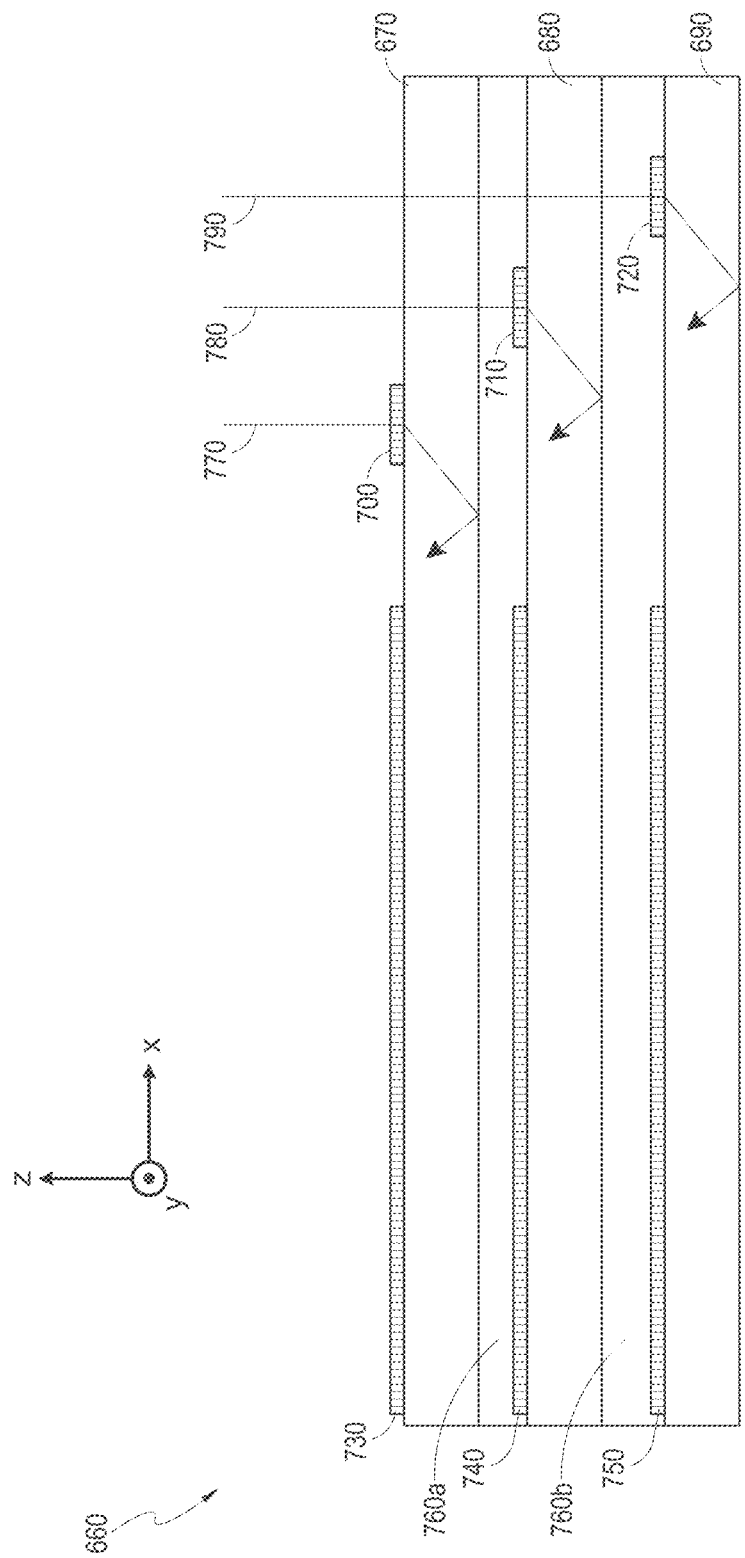
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple the light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for case of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
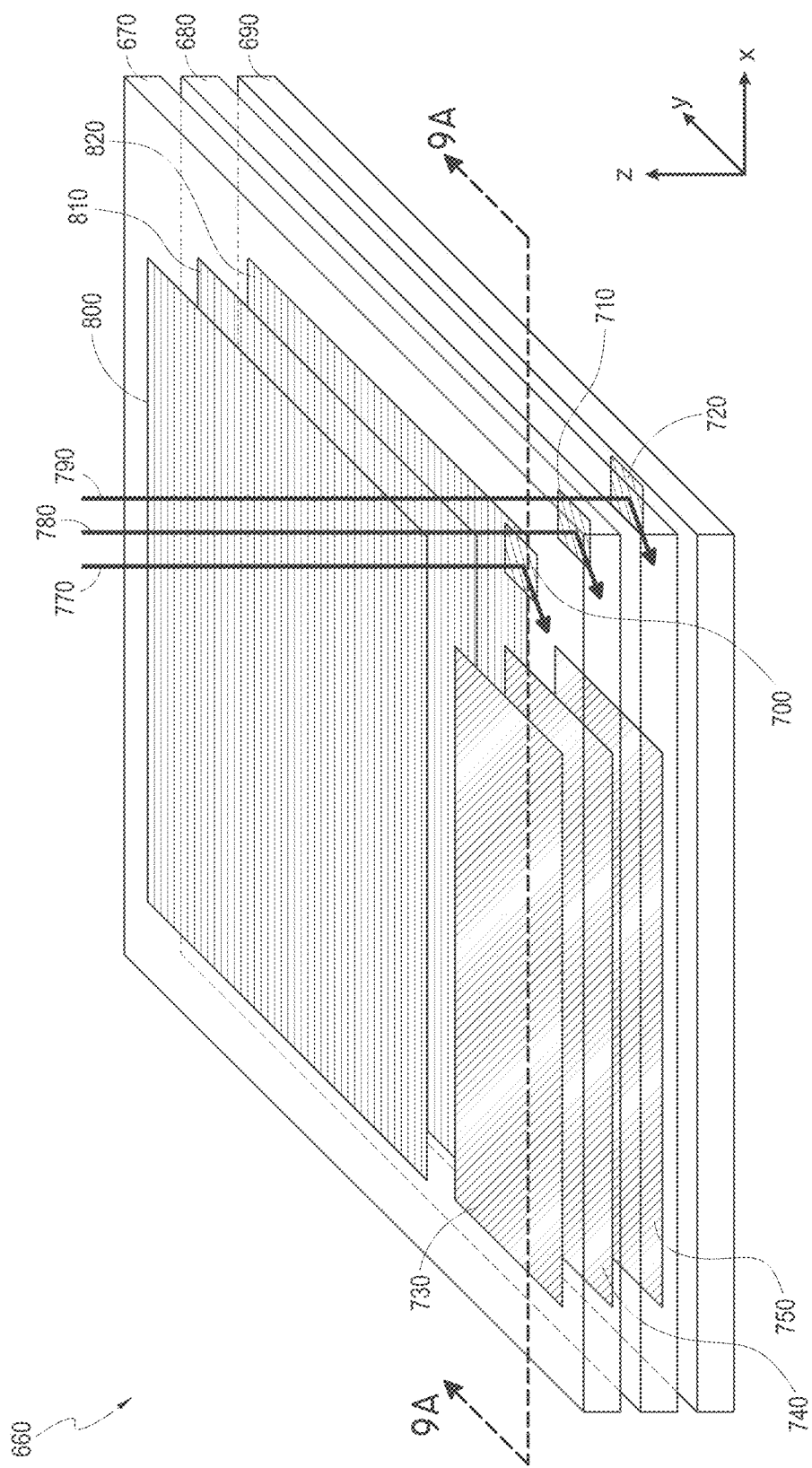
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, and 820, respectively.

In some embodiments, the light distributing elements 730, 740, 750 are orthogonal pupil expanders (OPE's). In some embodiments, the OPE's both deflect or distribute light to the out-coupling optical elements 800, 810, 820 and also increase the beam or spot size of this light as it propagates to the out-coupling optical elements. In some embodiments, e.g., where the beam size is already of a desired size, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle that will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
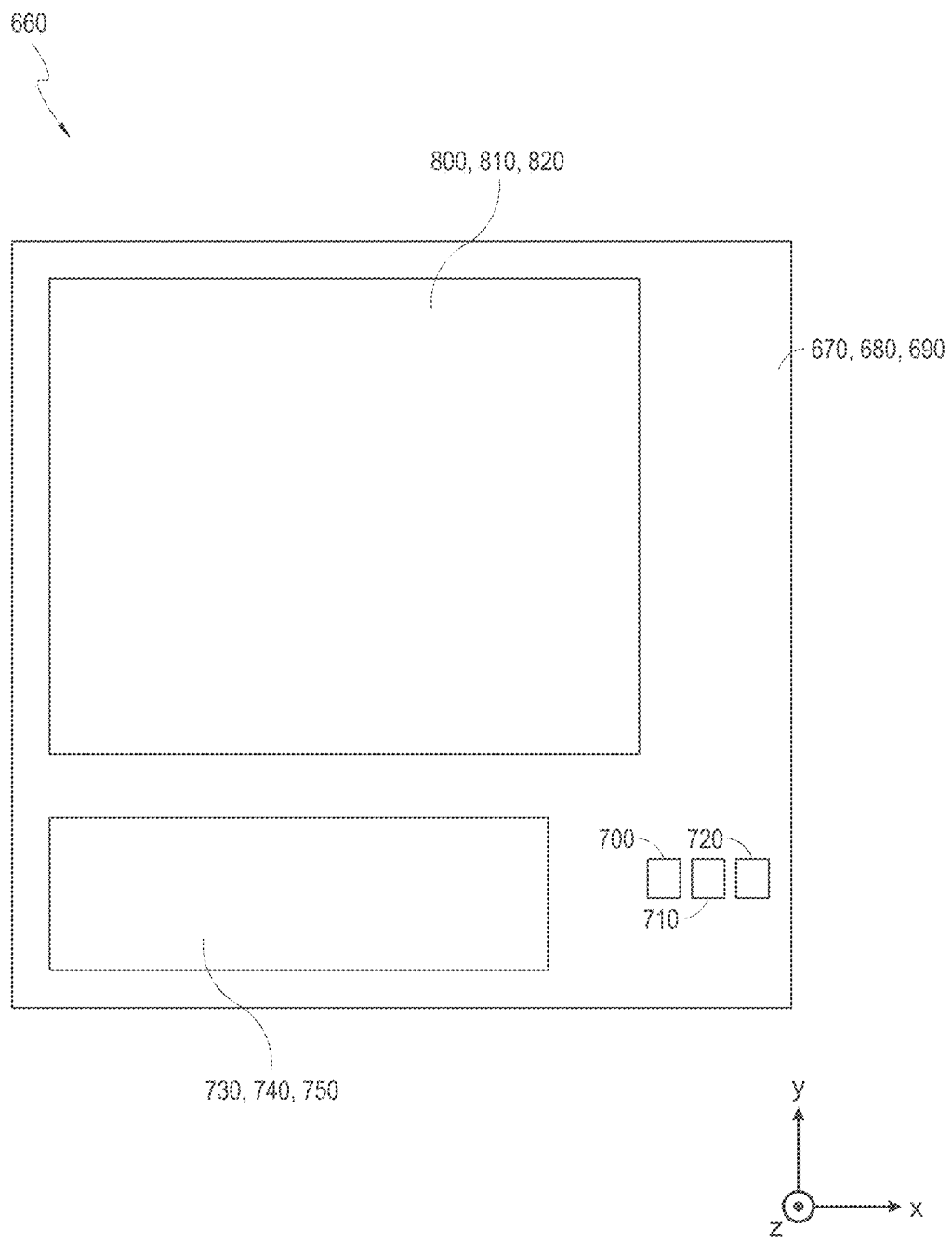
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this non-overlapping spatial arrangement facilitates the injection of light from different resources into different waveguides on a one-to-one basis, thereby allowing a specific light source to be uniquely coupled to a specific waveguide. In some embodiments, arrangements including non-overlapping spatially separated in-coupling optical elements may be referred to as a shifted pupil system, and the in-coupling optical elements within these arrangements may correspond to sub pupils.

Example Imaging Systems for Off-Axis Imaging

As described above, the eyes or tissue around the eyes of the wearer of a HMD (e.g., the wearable display system 200 shown in FIG. 2) can be imaged using multiple coupling optical elements to direct light from the eye through a substrate and into a camera assembly. The resulting images can be used to track an eye or eyes, image the retina, reconstruct the eye shape in three dimensions, extract biometric information from the eye (e.g., iris identification), etc.

As outlined above, there are a variety of reasons why a HMD might use information about the state of the eyes of the wearer. For example, this information can be used for estimating the gaze direction of the wearer or for biometric identification. This problem is challenging, however, because of the short distance between the HMD and the wearer's eyes. It is further complicated by the fact that gaze tracking requires a larger field of view, while biometric identification requires a relatively high number of pixels on target on the iris. For an imaging system that will attempt to accomplish both of these objectives, the requirements of the two tasks are largely at odds. Finally, both problems are further complicated by occlusion by the eyelids and eyelashes. Embodiments of the imaging systems described herein may address at least some of these problems.

Figure 10A:
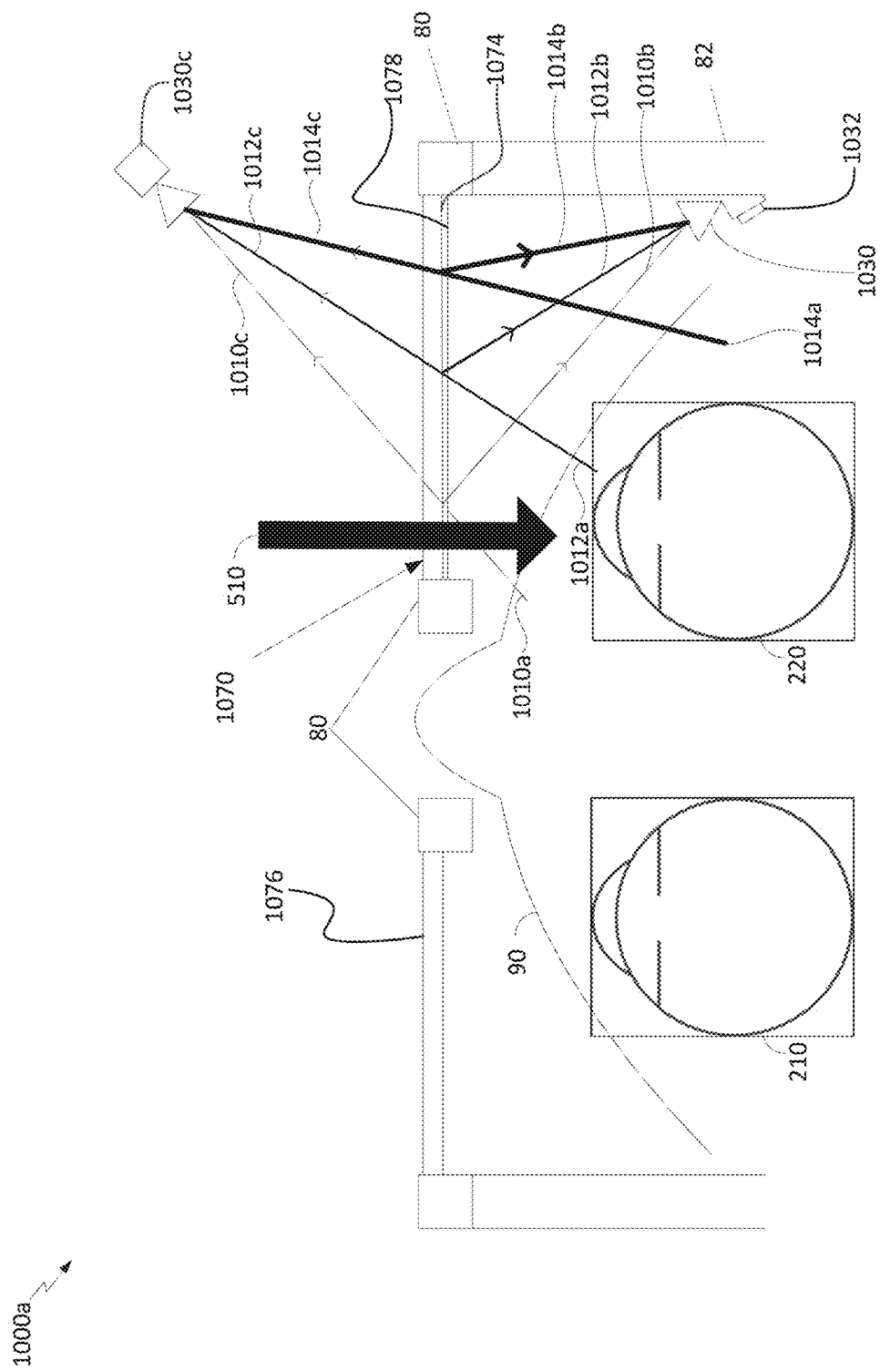
FIGS. 10A & 10B schematically illustrate example imaging systems comprising a coupling optical element and a camera assembly for tracking an eye.
Figure 10B:
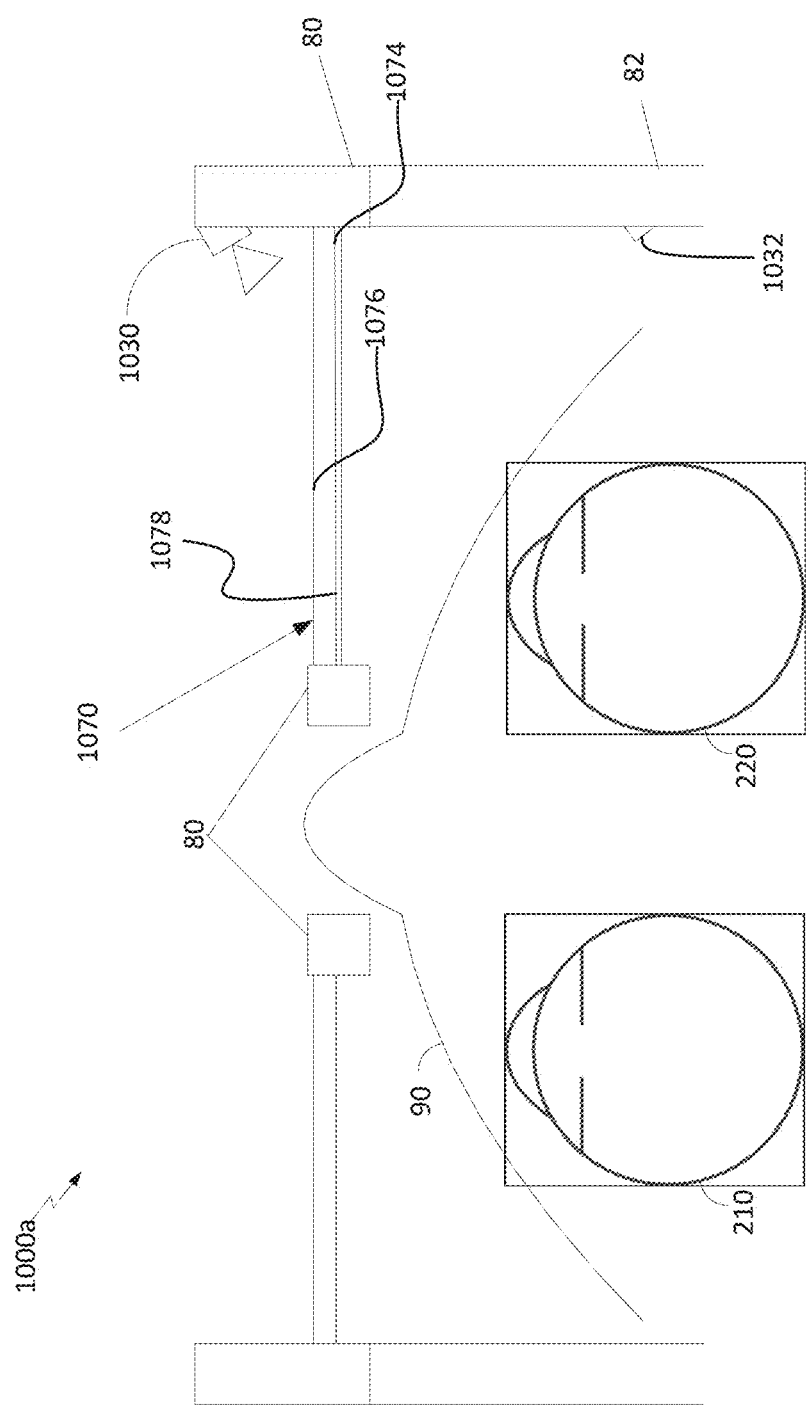

FIGS. 10A and 10B schematically illustrate an example of an imaging system 1000a configured to image one or both eyes 210, 220 of a wearer 90. The imaging system 1000a comprises a substrate 1070 and a camera assembly 1030 arranged to view the eye 220. Embodiments of the imaging system 1000a described herein with reference to FIGS. 10A and 10B can be used with HMDs including the display devices described herein (e.g., the wearable display system 200 shown in FIG. 2, the display system 250 shown in FIGS. 6 and 7, and the stack 660 of FIGS. 9A-9C). For example, in some implementations where the imaging system 1000a is part of the display system 250 of FIG. 6, the substrate 1070 may replace one of the waveguides 270, 280, 290, 300, or 310, may be disposed between the of waveguide stack 260 and eye 210, or may be disposed between the waveguide stack 260 and the world 510.

In some embodiments, the camera assembly 1030 may be mounted in proximity to the wearer's eye, for example, on a frame 80 of the wearable display system 60 of FIG. 2 (e.g., on an ear stem 82 near the wearer's temple); around the edges of the display 70 of FIG. 2 (as shown in FIG. 10B); or embedded in the display 70 of FIG. 2. The camera assembly 1030 may be substantially similar to camera assembly 630 of FIG. 6. In other embodiments, a second camera assembly can be used for separately imaging the wearer's other eye 210. The camera assembly 1030 can include an IR digital camera that is sensitive to IR radiation. The camera assembly 1030 can be mounted so that it is forward facing (e.g., in the direction of the wearer's vision toward), as illustrated in FIG. 10A, or the camera assembly 1030 can be mounted to be facing backward and directed at the eye 220 (e.g., FIG. 10B).

In some embodiments, the camera assembly 1030 may include an image capture device and a light source 1032 to project light to the eye 220, which may then be reflected by the eye 220 and detected by the camera assembly 1030. While the light source 1032 is illustrated as attached to the camera assembly 1030, the light source 1032 may be disposed in other areas with respect to the camera assembly such that light emitted by the light source is directed to the eye of the wearer and reflected to the camera assembly 1030. For example, where the imaging system 1000a is part of the display system 250 (FIG. 6) and the substrate 1070 replaces one of waveguides 270, 280, 290, 300, or 310, the light source 1032 may be one of light emitters 360, 370, 380, 390, or light source 530.

In the embodiment illustrated in FIG. 10A, the camera assembly 1030 is positioned to view a proximal surface 1074 of the substrate 1070. The substrate 1070 can be, for example, a portion of the display 70 of FIG. 2 or a lens in a pair of eyeglasses. The substrate 1070 can be transmissive to at least 10%, 20%, 30%, 40%, 50%, or more of visible light incident on the substrate 1070. In other embodiments, the substrate 1070 need not be transparent (e.g., in a virtual reality display). The substrate 1070 can comprise one or more coupling optical elements 1078. In some embodiments, the coupling optical elements 1078 may be selected to reflect a first range of wavelengths while being substantially transmissive to a second range of wavelengths different from the first range of wavelengths. In some embodiments, the first range of wavelengths can be IR wavelengths, and the second range of wavelengths can be visible wavelengths. The substrate 1070 may comprise a polymer or plastic material such as polycarbonate or other lightweight materials having the desired optical properties. Without subscribing to a particular scientific theory, plastic materials may be less rigid and thus less susceptible to breakage or defects during use. Plastic materials may also be lightweight, thus, when combined with the rigidity of the plastic materials allowing thinner substrates, may facilitate manufacturing of compact and light weight imaging systems. While the substrate 1070 is described as comprising a polymer such as polycarbonate or other plastic having the desired optical properties, other materials are possible, such as glass having the desired optical properties, for example, fused silica.

The coupling optical elements 1078 can comprise a reflective optical element configured to reflect or redirect light of a first range of wavelengths (e.g., IR light) while transmitting light of a second range of wavelengths (e.g., visible light). In such embodiments, IR light 1010a, 1012a, and 1014a from the eye 220 propagates to and reflects from the coupling optical elements 1078, resulting in reflected IR light 1010b, 1012b, 1014b which can be imaged by the camera assembly 1030. In some embodiments, the camera assembly 1030 can be sensitive to or able to capture at least a subset (such as a non-empty subset or a subset of less than all) of the first range of wavelengths reflected by the coupling optical elements 1078. For example, where the coupling optical elements 1078 is a reflective element, the coupling optical elements 1078 may reflect IR light in the a range of 700 nm to 1.5 µm, and the camera assembly 1030 may be sensitive to or able to capture near IR light at wavelengths from 700 nm to 900 nm. As another example, the coupling optical elements 1078 may reflect IR light in the a range of 700 nm to 1.5 µm, and the camera assembly 1030 may include a filter that filters out IR light in the range of 900 nm to 1.5 µm such that the camera assembly 1030 can capture near IR light at wavelengths from 700 nm to 900 nm.

Visible light from the outside world (e.g., world 510 of FIG. 6) can be transmitted through the substrate 1070 and perceived by the wearer. In effect, the imaging system 1000a can act as if there were a virtual camera assembly 1030c directed back toward the wearer's eye 220 capturing a direct view image of the eye 220. Virtual camera assembly 1030c is labeled with reference to "c" because it may image virtual IR light 1010c, 1012c, and 1014c (shown as dotted lines) propagated from the wearer's eye 220 through the substrate 1070. Although coupling optical elements 1078 is illustrated as disposed on the proximal surface 1074 of the substrate 1070, other configurations are possible. For example, the coupling optical elements 1078 can be disposed on a distal surface 1076 of the substrate 1060 or within the substrate 1070. In implementations where the substrate 1070 is part of display system 250 of FIG. 6, the coupling optical element 1078 may be an out-coupling optical element 570, 580, 590, 600, or 610.

While an example arrangement of imaging system 1000a is shown in FIG. 10A, other arrangements are possible. For example, multiple coupling optical elements may be used and configured to in-couple light into the substrate 1070 via TIR and out-couple the light to the camera assembly 1030, for example, as will be described in connection to FIGS. 11-18. While the coupling optical elements 1078 have been described as reflective optical elements, other configurations are possible. For example, the coupling optical elements 1078 may be a transmissive coupling optical element that substantially transmits a first and a second range of wavelengths. The transmissive coupling optical element may refract a first wavelength at an angle, for example, to induce TIR within the substrate 1070, while permitting the second range of wavelengths to pass substantially unhindered.

Figure 11:
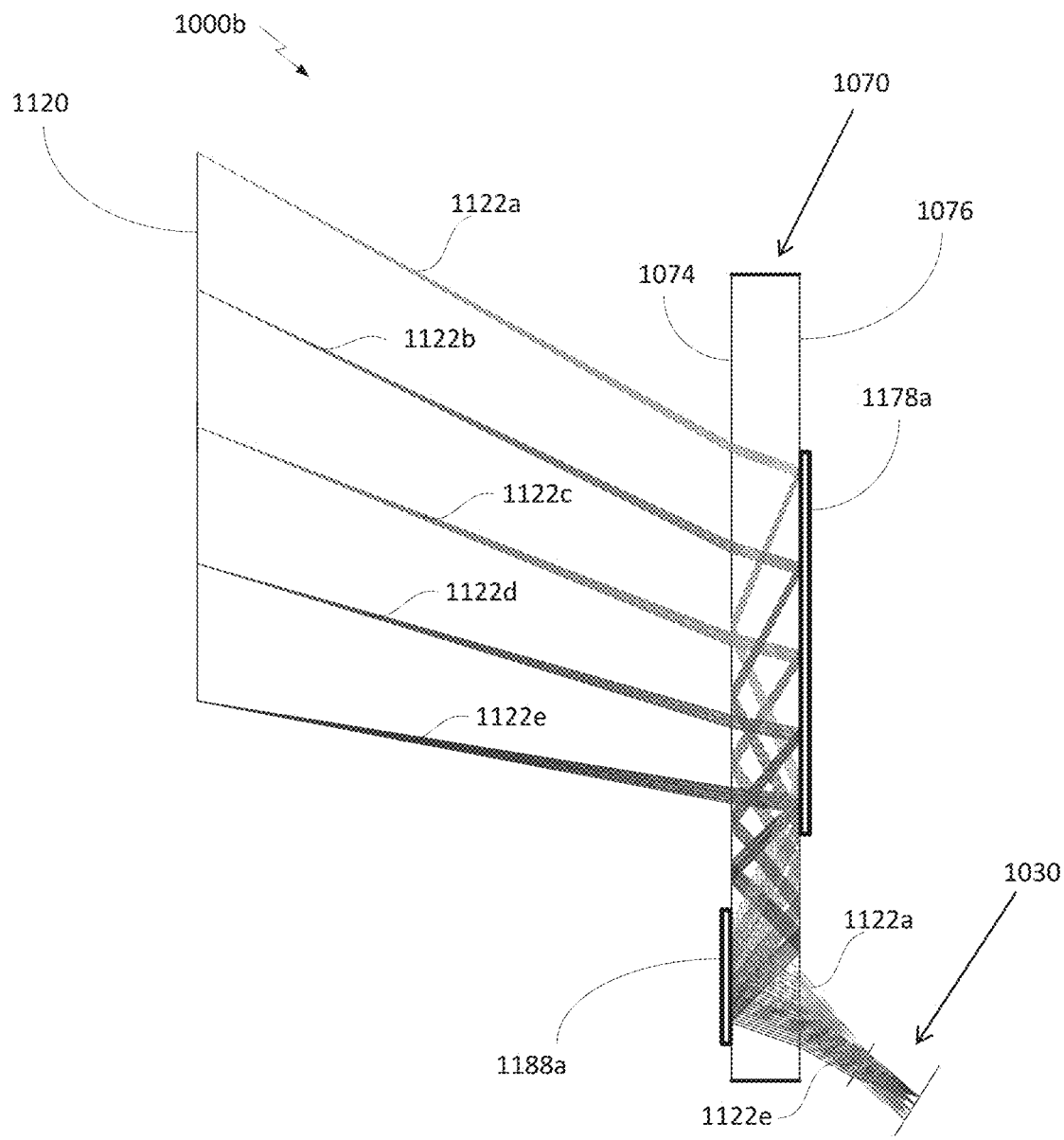
FIG. 11 schematically illustrates another example imaging system comprising multiple coupling optical elements to totally internally reflect light from an object through a substrate to image the object at a camera assembly.

Example Imaging Systems for Off-Axis Imaging Using Multiple Coupling Optical Elements FIG. 11 schematically illustrates another example imaging system 1000b comprising multiple coupling optical elements to totally internally reflect light from an object through a substrate 1070 to image an object at a camera assembly 1030. FIG. 11 illustrates an embodiment of imaging system 1000b comprising a substrate 1070 comprising at least two coupling optical elements 1178a, 1188a disposed on one or more surfaces of the substrate 1070 and a camera assembly 1030 arranged to view an object positioned at an object plane 1120. While a specific arrangement is depicted in FIG. 11, this is for illustrative purposes only and not intended to be limiting. Other optical elements (for example, lenses, waveguides, polarizers, prisms, etc.) may be used to manipulate the light from the object so to focus, correct aberrations, direct, etc., the light as desired for the specific application.

In the embodiment of FIG. 11, the substrate 1070 includes two coupling optical elements 1178a, 1188a, each disposed adjacent to the distal and proximal surfaces 1076, 1074 of the substrate 1070, respectively. In some embodiments, the coupling optical elements 1178a, 1188a may be attached or fixed to the surfaces of the substrate 1070. In other embodiments, one or more of the coupling optical element 1178a, 1188a may be embedded in the substrate 1070 or etched onto the surfaces of the substrate 1070. Yet, in other embodiments, alone or in combination, the substrate 1070 may be manufactured to have a region comprising the coupling optical elements 1178a, 1188a as part of the substrate 1070 itself. While an example arrangement of the coupling optical elements 1178a, 1188a is shown in FIG. 11, other configurations are possible. For example, coupling optical elements 1178a, 1188a may both be positioned adjacent to the distal surface 1076 or proximal surface 1074 (as illustrated in FIGS. 12A, 13A, 13B, and 14B) or coupling optical elements 1178a may be positioned on the proximal surface 1074 while coupling optical elements 1188a is positioned on the distal surface 1076 (as illustrated in FIG. 14A).

The coupling optical elements 1178a and 1188a may be similar to the coupling optical elements 1078 of FIGS. 10A and 10B. For example, FIG. 11 illustrates the imaging system 1000b where both coupling optical elements 1178a, 1188a are reflective coupling optical elements that are wavelength selective, such that they selectively redirect one or more wavelengths of light, while transmitting other wavelengths of light, as described above in connection to FIG. 10A. In some embodiments, the coupling optical elements 1178a and 1188a deflect light of a first wavelength range (e.g., IR light, near-IR light, etc.) while transmitting a second wavelength range (e.g., visible light). As described below, the coupling optical elements 1178a, 1188a may comprise diffractive features forming a diffraction patter (e.g., a DOE).

Referring to FIG. 11, the camera assembly 1030 is mounted backward facing toward the object plane 1120 and viewing the distal surface 1076. In various embodiments, the camera assembly 1030 may be mounted in proximity to the wearer's eye (for example on the frame 80 of FIG. 2) and may include light source 1032 (not shown in FIG. 11). The camera assembly 1030 can include an IR digital camera that is sensitive to IR radiation. While the camera assembly 1030 of FIG. 11 is shown as backward facing, other arrangements are possible. For example, camera assembly 1030 can be mounted so that it is forward facing.

In some embodiments, an object (e.g., the eye 220 or a part thereof) at the object plane 1120 may be illuminated by the light source 1032 (FIGS. 10A and 10B). For example, where the pupil is to be imaged, the light source 1032 is directed thereto and illuminates the pupil of eye 220. In other embodiments, the first Purkinje image, which is the virtual image formed by the reflection of a point source off the anterior surface of the cornea may be imaged. Any physical or optical object associated with the eye that can be uniquely identified and that will indicate eye position, pupil position, or gaze direction may be imaged. Upon illumination, the object may reflect the light toward the substrate 1070 as light rays 1122a-e (collectively referred to hereinafter as "1122"). For example, light rays 1122a-e may be illustrative of diffuse light reflected from the pupil, iris, eyelid, sclera, other tissue around the eye, etc. In another example, light rays 1122a-e may be illustrative of specularly reflected light from a glint (e.g., a Purkinje image). Without subscribing to a scientific theory, a reflection from the eye, parts of the eye, or tissue around the eye may rotate the polarization of the incident light depending on the orientation of the illumination. In some embodiments, the light source 1032 (FIGS. 10A and 10B) may be a LED light source that does not have a specific polarization, unless a polarizer is implemented in the optical path with may reduce the intensity of the light, for example, by as much of 50%. While only light rays 1122 are shown in FIG. 11, this is for illustrative purposes only and any number of reflected light rays are possible. Each of light rays 1122 may be reflected at the same or different angles from the object. For example, FIG. 11 illustrates that light ray 1122a is reflected at a first angle that may be larger than the angle at which light ray 1122e is reflected from the object. Other configurations are possible.

While the above description referred to light rays 1122 as reflected from the object, other configurations are possible. In some embodiments, the light rays 1122 are emitted by a light source located at the object plane 1120 instead of reflecting light from the source 1032 (FIGS. 10A and 10B). As such, the light rays 1122 may be directed toward the substrate 1070. It will be understood that light rays 1122 may be all or some of the light reflected from or emitted by the object plane 1120.

As illustrated in FIG. 11, upon emanating from the object plane 1120, the light rays 1122 are incident on the proximal surface 1074 of the substrate at an angle of incidence relative to an imaginary axis perpendicular to the proximal surface 1074 at the point of incidence. The light rays 1122 then enter the substrate 1070 and are refracted based, in part, on angle of incidence at the proximal surface 1074 and the ratio of the refractive indices of the substrate 1070 and the medium immediately adjacent to the proximal surface 1074.

The light rays 1122 travel to and impinge upon the coupling optical element 1178a at an angle of incidence relative to an imaginary axis perpendicular to the distal surface 1076 at the point of incidence. The light rays 1122 are deflected by the coupling optical element 1178a so that they propagate through the substrate 1070; that is, the coupling optical element 1178a functions as a reflective in-coupling optical element that reflects the light into the substrate 1070. The light rays 1122 are reflected at angles such that the in-coupled light rays 1122 propagate through the substrate in lateral direction toward the coupling optical element 1188a by total internal reflection. Without subscribing to any scientific theory, the total internal reflection condition can be satisfied when the diffraction angle θ between the incident light and the perpendicular axis is greater than the critical angle, $\theta_C$, of the substrate 1070. Under some circumstances, the total internal reflection condition can be expressed as:

$$\sin(\theta_C) = n_o/n_s \qquad [1]$$

where $n_s$ is the refractive index of the substrate 1070 and $n_o$ is the refractive index of the medium adjacent to the surface substrate 1070. According to various embodiments, $n_s$ may be between about 1 and about 2, between about 1.4 and about 1.8, between about 1.5 and about 1.7, or other suitable range. For example, the substrate 1070 may comprise a polymer such as polycarbonate or a glass (e.g., fused silica, etc.). In some embodiments, the substrate 1070 may be 1 to 2 millimeters thick, from the proximal surface 1074 to the distal surface 1076. For example, the substrate 1070 may be a 2 millimeter thick portion of fused silica or a 1 millimeter thick portion of polycarbonate. Other configurations are possible to achieve the desired operation and image quality at the camera assembly 1030.

In some embodiments, the substrate 1070 may be formed of high refractive index material (e.g., materials having a higher refractive index than the medium immediately adjacent to the substrate 1070). For example, the refractive index of the material immediately adjacent to the substrate 1070 may be less than the substrate refractive index by 0.05 or more, or 0.10 or more. Without subscribing to a particular scientific theory, the lower refractive index medium may function to facilitate TIR of light through the substrate 1070 (e.g., TIR between the proximal and distal surfaces 1074, 1076 of the substrate 1070). In some embodiments, the immediately adjacent medium comprises air with a refractive index $n_o$ of about 1. Critical angles can be in a range from 20 degrees to 50 degrees, depending on the substrate material and surrounding medium. In other embodiments, alone or in combination, the immediately adjacent medium may comprise other structures and layers, for example, one or more of the layers described in connection to FIGS. 6 and 9A-9C may be immediately adjacent to either the proximal or distal surface 1074, 1076 of the substrate 1070.

The light then propagates through the substrate 1070 in a direction generally parallel with the surfaces of the substrate 1070 and toward the coupling optical element 1188a. Generally toward may refer to the condition that the light rays 1122 are reflected between the surfaces of the substrate 1070 and as such travel in directions that may not be exactly parallel to the substrate 1070, but the overall direction of travel is substantially parallel with the surfaces of the substrate. The light rays 1122 propagate through the substrate 1070 by TIR until impinging on the coupling optical element 1188a. Upon reaching the coupling optical element 1188a, the light rays 1122 are deflected so that they propagate out of the substrate 1070; that is, the coupling optical element 1188a functions as a reflective out-coupling optical element that reflects the light out of the substrate 1070. The light rays 1120 are reflected at angles such that the TIR condition is no longer satisfied (e.g., the diffraction angle θ is less than the critical angle $θ_C$). The coupling optical element 1188a may also reflect the light rays 1122 at an angle toward the camera assembly 1030. For example, the light rays 1122 may be reflected at an angle so as to exit the substrate 1070, are refracted by the interface at the distal surface 1076, and propagate to the camera assembly 1030. The camera assembly 1030 then receives the light rays 1122 and images the object plane 1120 based thereon.

While FIG. 11 illustrates a configuration in which light travels from coupling optical element 1178a to coupling optical element 1188a with two instances of total internal reflection, other configurations are possible. For example, the light rays 1122 may be totally internally reflected any number of times (e.g., 1, 2, 3, 4, 5, 6, 7, etc.) such that the light rays 1122 travel through the substrate 1070 toward the camera assembly 1030. The camera assembly 1030 may thus be positioned anywhere and configured to capture a direct view image at some distance from the object. Without subscribing to a scientific theory, TIR maybe include highly efficiency, substantially lossless reflections, thus the number of times the light rays 1122 TIR may be selected based on the desired position of the camera. However, in some embodiments, some leakage, even minimal, may occur at each reflection within the substrate 1070. Thus, minimizing the number of reflections within the substrate 1070 may reduce leakage of light and improve image capture performance. Furthermore, without subscribing to a scientific theory, reducing the number of reflections may improve image quality by reducing image blurring or brightness reduction (e.g., fewer reflections may produce a brighter more intense image) due to impurity or non-uniform surfaces of the substrate 1070. Therefore, design of the imaging systems described, and the components thereof, may be optimized with these considerations in mind so as to minimize the number of TIR events and position the camera assembly 1030 as desired.

Efficient in- and out-coupling of light into the substrate 1070 can be a challenge in designing waveguide-based see-through displays, e.g., for virtual/augmented/mixed reality display applications. For these and other applications, it may be desirable to include diffraction gratings formed of a material whose structure is configurable to optimize various optical properties, including diffraction properties. The desirable diffraction properties may include, among other properties, polarization selectivity, spectral selectivity, angular selectivity, high spectral bandwidth, and high diffraction efficiencies, among other properties. To address these and other needs, in various embodiments disclosed herein, the coupling optical elements 1178a, 1188a may comprise diffractive features that form a diffraction pattern, such as DOEs or diffraction gratings.

Generally, diffraction gratings have a periodic structure, which splits and diffracts light into several beams traveling in different directions. The direction of the beams depends, among other things, on the period of the periodic structure and the wavelength of the light. The period may be, in part, based on the grating spatial frequency of the diffractive features. To optimize certain optical properties, e.g., diffraction efficiencies and reduce potential rainbow effects, for certain applications such as in- and out-coupling light from the substrate 1070, various material properties of the DOE can be optimized for a given wavelength. For example, where IR light is used, the spatial frequency of the DOEs 1178a, 1188a may between 600 and 2000 lines per millimeter. In one embodiment, the spatial frequency may be approximately 1013 lines per millimeter (e.g., FIGS. 12A and 13A). In one embodiment, the example DOE 1178a of FIG. 11 may have 1013.95 lines per millimeter. In another embodiment, the spatial frequency is approximately 1400 lines per millimeter, as described in connection to FIG. 15. Thus, the spatial frequency of the coupling optical elements 1178a, 1188a may be, at least, one consideration when optimizing the imaging systems described herein. For example, the spatial frequency may be selected to support TIR conditions. As another example, alone or in combination, the spatial frequency may be selected to maximize light throughput with minimum artifacts (e.g., ghost or duplicative images as described in FIG. 12B) depending on the configuration and dimensions of the components of the imaging system. In some embodiments, the diffractive features may have any configurations; however the first coupling optical element 1178a may be optimized to have minimal or no visual artifacts (e.g., rainbow effects) because the first coupling optical element 1178a may be positioned within the user's field of view.

In some implementations, the DOE may be an off-axis DOE, an off-axis Holographic Optical Element (HOE), an off-axis holographic mirror (OAHM), or an off-axis volumetric diffractive optical element (OAVDOE). In some embodiments, an OAHM may have optical power as well, in which case it can be an off-axis volumetric diffractive optical element (OAVDOE). In some embodiments, one or more of the coupling optical elements 1178a, 1188a may be an off-axis cholesteric liquid crystal diffraction grating (OA-CLCG) which can be configured to optimize, among other things, polarization selectivity, bandwidth, phase profile, spatial variation of diffraction properties, spectral selectivity and high diffraction efficiencies. For example, any of the CLCs or CLCGs described in U.S. patent application Ser. No. 15/835,108, filed Dec. 7, 2017, entitled "Diffractive Devices Based On Cholesteric Liquid Crystal," which is incorporated by reference herein in its entirety for all it discloses, can be implemented as coupling optical elements as described herein. In some embodiments, one or more coupling optical elements 1178a, 1188a may be switchable DOEs that can be switched between "on" states in which they actively diffract, and "off" states in which they do not significantly diffract.

In some embodiments, one or more of the coupling optical elements 1178a, 1188a may be any reflective or transmissive liquid crystal gratings. The above described CLCs or CLCGs may be one example of a liquid crystal grating. Other liquid crystal gratings may also include liquid crystal features and/or patterns that have a size less than the wavelength of visible light and may comprise what are referred to as Pancharatnam-Berry Phase Effect (PBPE) structures, metasurfaces, or metamaterials. For example, any of the PBPE structures, metasurfaces, or metamaterials described in U.S. Patent Publication No. 2017/0010466, entitled "Display System With Optical Elements For In-Coupling Multiplexed Light Streams"; U.S. patent application Ser. No. 15/879,005, filed Jan. 24, 2018, entitled "Antireflection Coatings For Metasurfaces"; or U.S. patent application Ser. No. 15/841,037, filed Dec. 13, 2017, entitled "Patterning Of Liquid Crystals Using Soft-Imprint Replication Of Surface Alignment Patterns," each of which is incorporated by reference herein in its entirety for all it discloses, can be implemented as coupling optical elements as described herein. Such structures may be configured for manipulating light, such as for beam steering, wavefront shaping, separating wavelengths and/or polarizations, and combining different wavelengths and/or polarizations can include liquid crystal gratings with metasurface, otherwise referred to as metamaterials liquid crystal gratings or liquid crystal gratings with PBPE structures. Liquid crystal gratings with PBPE structures can combine the high diffraction efficiency and low sensitivity to angle of incidence of liquid crystal gratings with the high wavelength sensitivity of the PBPE structures.

In some embodiments, certain DOEs may provide non-limiting advantages when utilized as the coupling optical elements as described herein. For example, without subscribing to a scientific theory, liquid crystal gratings, CLCs, CLCGs, volume phase gratings, and meta-surface gratings may comprise optical properties configured to reduce or eliminate the appearance of visual artifacts, such as rainbow effects described above and herein. In some embodiments, when employing these DOEs, it may be desirable to illuminate the DOE with polarized light (e.g., the light rays 1122 may include a desired polarization) to maximize the throughput of light into the substrate 1070. However, as described above, the eye may rotate the polarization of incident depending on the orientation, thus, in some embodiments, the light source 1030 may emit un-polarized light. The reflected light rays 1122 may also be un-polarized, thus a portion of the light may not be throughput due to the polarization properties of the DOE (e.g., up to 50% of the light ray 1122 may be lost at the coupling optical element 1178a). In some embodiments, to improve throughput, a double layer DOE may be used as the coupling optical element 1178a. For example, a first DOE layer configured to operate at one polarization state and as second DOE layer configured to operate at a second polarization state.

For some embodiments, it may be desirable to use DOEs having sufficiently high diffraction efficiency so that as much of the light rays 1122 are in-coupled into the substrate 1070 and out-coupled toward the camera assembly. Without subscribing to a scientific theory, relatively high diffraction efficiency may permit directing substantially all of the light received at the coupling optical element 1178a to the camera assembly 1030, thereby improving image quality and accuracy. In some embodiments, the diffraction efficiency may be based, in part, on the sensitivity of the camera assembly 1030 (e.g., a higher sensitivity may permit a lower diffraction efficiency). In various embodiments, a DOE may be selected to have a high diffractive efficiency with respect to a first range of wavelengths (e.g., IR light) and low diffractive efficiency in a second range of wavelengths (e.g., visible light). Without subscribing to a scientific theory, a low diffractive efficiency with respect to visible light may reduce rainbow effects in the viewing path of the user.

In some applications, a DOE may cause a rainbow effect when a user views visible light through diffractive features. Without subscribing to a particular scientific theory, the rainbow affect may be the result of a range of wavelengths interacting with the diffractive features, thereby deflecting different wavelengths (e.g., colors) in different directions a different diffraction angles. In some embodiments described herein, the rainbow effect from the world interacting with the coupling optical elements 1178a, 1188b as viewed by a user may be reduced by modifying or controlling the diffractive features to reduce this effect. For example, since the diffraction angle of light on a DOE is based on the period or spatial frequency of the grating, the shape of the diffractive features may be selected to concentrate the majority of the diffracted light at a particular location for a given range of wavelengths (e.g., a triangular cross section or blazing).

In some embodiments, the substrate 1070 may be one of the waveguides 270, 280, 290, 300, or 310 of FIG. 6. In this embodiment, the corresponding out-coupling optical element 570, 580, 590, 600, or 610 may be replaced with an in-coupling optical element 1178a configured to induce TIR of light reflected by the eye. In some embodiments, a portion of out-coupling optical element 570, 580, 590, 600, or 610 may be replaced with an in-coupling optical element 1178, such that the corresponding waveguide 270, 280, 290, 300, or 310 may be used as described in connection to FIG. 6 and to direct light reflected to camera assembly 630.

In some embodiments, the substrate 1070 may be one the waveguides 670, 680, or 690 of FIGS. 9A-9C. In these embodiments, the corresponding light distributing elements 800, 810, and 830, or a portion thereof, may be replaced with the in-coupling optical element 1178a, while the in-coupling optical element 700, 710, and 720, or portion thereof, may be replaced with the out-coupling optical element 1188a. In some embodiments, the OPEs 730, 740, and 750 may remain in the optical path of the light traveling from the in-coupling optical element 1178a to the out-coupling optical element 1188a. However, the OPEs 730, 740, and 750 may be configured to distribute the light to out-coupling optical element 1188a and also decrease the beam spot size as it propagates.

In various embodiments, the field of view of the camera assembly 1030 is configured to be sufficient to image the entire object plane 1120 (e.g., the eye 220 of FIG. 10, a part thereof, or tissue surrounding the eye) throughout a variety of field positions. For example, in the example shown in FIG. 11 the size of the imaged object plane 1120 may be 30 mm (horizontal) by 16 mm (vertical). In some embodiments, the coupling optical elements 1178a, 1188a are designed to be large enough to at least match the size of the object to be imaged; that is the coupling optical elements 1178a, 1188a are configured to receive light from the full size of the imaged object. For example, the coupling optical element 1178a receive light originating from the eye 220. The coupling optical element 1188 may be sized so as to reflect substantially all of the light rays 1122 that propagate through the substrate 1070 toward the camera assembly 1030.

In various embodiments, other optical elements may be positioned along the path the light rays 1122 travel. For example, intervening optical elements may be included between the substrate 1070 and the object plane 1120 for directing the light rays 1122 toward the substrate 1070 at the desired angle. Intervening optical elements may be included between the camera assembly 1030 and the substrate 1070 directing and focusing the light rays 1122 toward the camera assembly 1030 so as to place the camera assembly 1030 at any desired location. In some embodiments, intervening optical elements may be used to filter the light rays 1122, change polarization or correct for aberrations. For example, a corrective optical element may be positioned along the optical path of the light rays 1122 arranged to and configured to reduce or eliminate optical aberrations introduced by the optical components of the imaging system or, where the imaging system is part of the display system 250 of FIG. 6, other waveguides or optical elements.

Alternative Embodiments for Off-Axis Imaging Using Multiple Coupling Optical Elements While FIG. 11 shows an example imaging system 1000b comprising the substrate 1070 having coupling optical elements 1178a, 1188a configured to TIR light from the object plane 1120 through the substrate 1070, other configurations are possible. For example, FIG. 11 illustrates both coupling optical elements 1178a, 1188a as reflective coupling optical elements; however, one or both coupling optical elements may be transmissive coupling optical elements configured to refract a first range of wavelengths at an angle satisfying the TIR conditions, while transmitting a second range of wavelengths substantially through the substrate 1070. FIGS. 12A-18 illustrate some embodiments of substrate 1070, however, other configurations are possible.

Figure 12A:
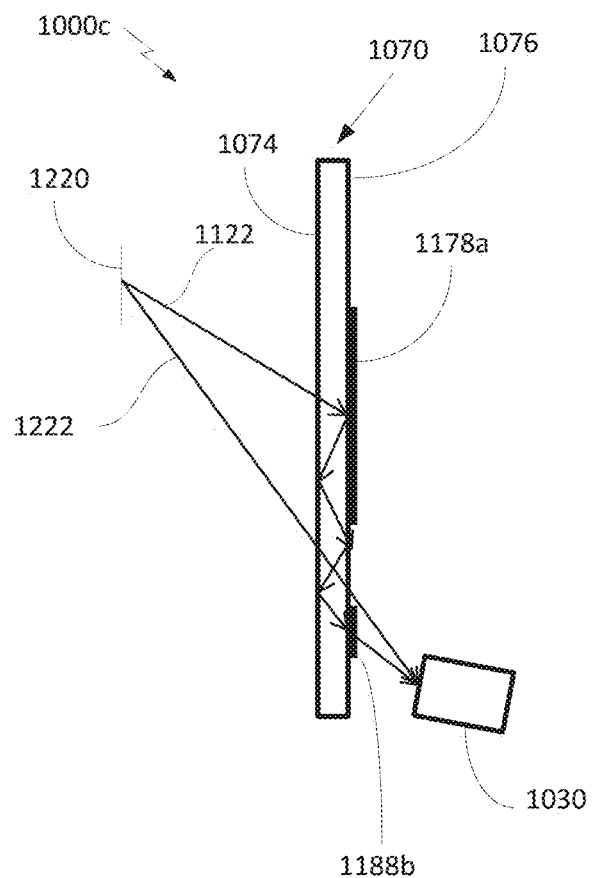
FIG. 12A schematically illustrates another example imaging system comprising multiple coupling optical elements to totally internally reflect light from an object through a substrate to image the object at a camera assembly.

FIG. 12A schematically illustrates an example imaging system 1000c. The imaging system 1000c uses multiple coupling optical elements 1178a, and 1188b to TIR the light 1122 from an object plane 1220 through the substrate 1070. Similar to FIG. 11, FIG. 12A illustrates the coupling optical element 1178a as a reflective coupling optical element disposed on the distal surface 1076 of the substrate 1070 that in-couples the light ray 1122 into the substrate 1070. However, while coupling optical element 1188b is substantially similar to coupling optical element 1188a of FIG. 11, FIG. 12A illustrates a transmissive coupling optical element 1188b disposed on the distal surface 1076 of the substrate 1070. Thus, upon propagating through the substrate 1070 via TIR, the light rays 1122 are reflected a third time on the proximal surface 1074 toward the transmissive coupling optical element 1188b. The transmissive coupling optical element 1188b refracts the light rays 1122 at an angle such that the TIR conditions no longer hold and the light rays 1122 exit the substrate 1070. For example, where the transmissive coupling optical element 1188b is a DOE, the light is refracted based on the spatial frequency of the DOE and are substantially deflected toward the camera assembly 1030.

FIG. 12A also illustrates a stray light ray 1222 that is captured by the camera assembly 1030. For example, stray light ray 1222 is reflected by the object 1120, but instead of propagating through the coupling optical elements 1178a, 1188b, some or all of the stray light ray 1222 travels directly toward the camera assembly 1030. Without subscribing to a particular theory, the stray light ray 1222 is captured by the camera assembly 1030, thereby producing a direct view image, as described above. Thus, the camera assembly 1030 may capture a direct view image based on the light ray 1222 (e.g., including the narrow FOV and defects described herein) along with the desired image based on the light rays 1122 that TIR through the substrate. Since the camera assembly 1030 captures light rays that have traveled along different optical paths, the final image would include various imperfections. One such imperfection is illustrated in FIG. 12B, but others are possible.

Figure 12B:
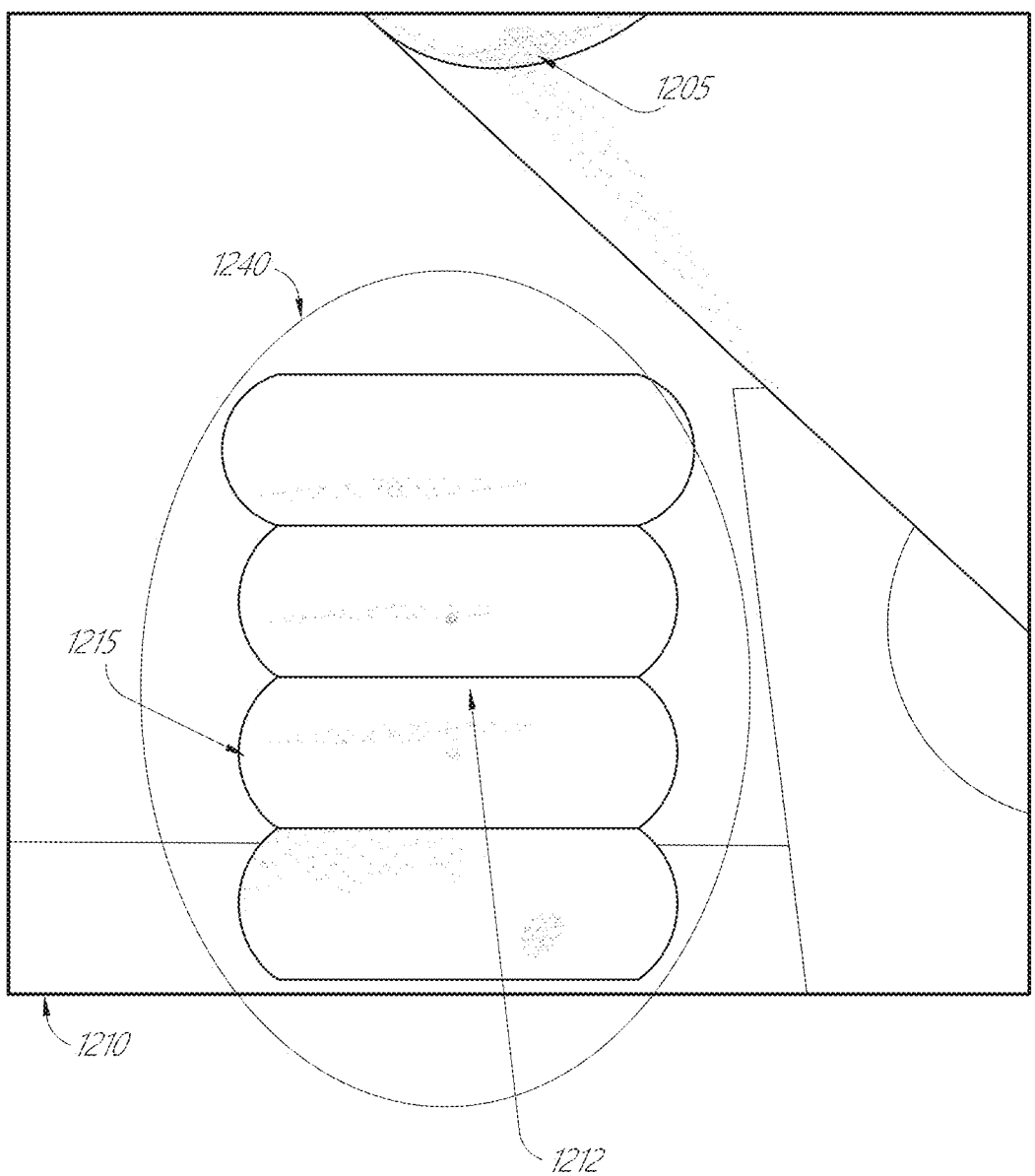
FIG. 12B is an example image of the object using the imaging system of FIG. 12A.

FIG. 12B illustrates an example image 1210 of an object 1120 captured using the camera assembly 1030 of FIG. 12A. In the illustrative image 1210, the camera assembly 1030 has captured an image 1210 of, for example, a front face of a laser diode used as an object and illuminated with an IR light source. While a laser diode is illustrated in this example, other objects may be used to similar effect, for example an eye 210 of a user. The image 1210 includes a direct view image 1205 of the laser diode produced by light ray 1222 and set of images 1240 produced by light rays 1122. The set of images 1240 includes a desired off-axis image (for illustrative purposes shown as image 1215) and multiple duplicative images (collectively illustrated as images 1212) from different perspectives. Such duplicative images 1212, in some embodiments, may require post-processing to synthesize a single perspective image of the object if desired. In other embodiments, the imaging system may be designed to reduce or eliminate the un-wanted duplicative images 1212 and direct view image 1205 so as to capture single perspective image 1215.

Figures 13A, 13B:
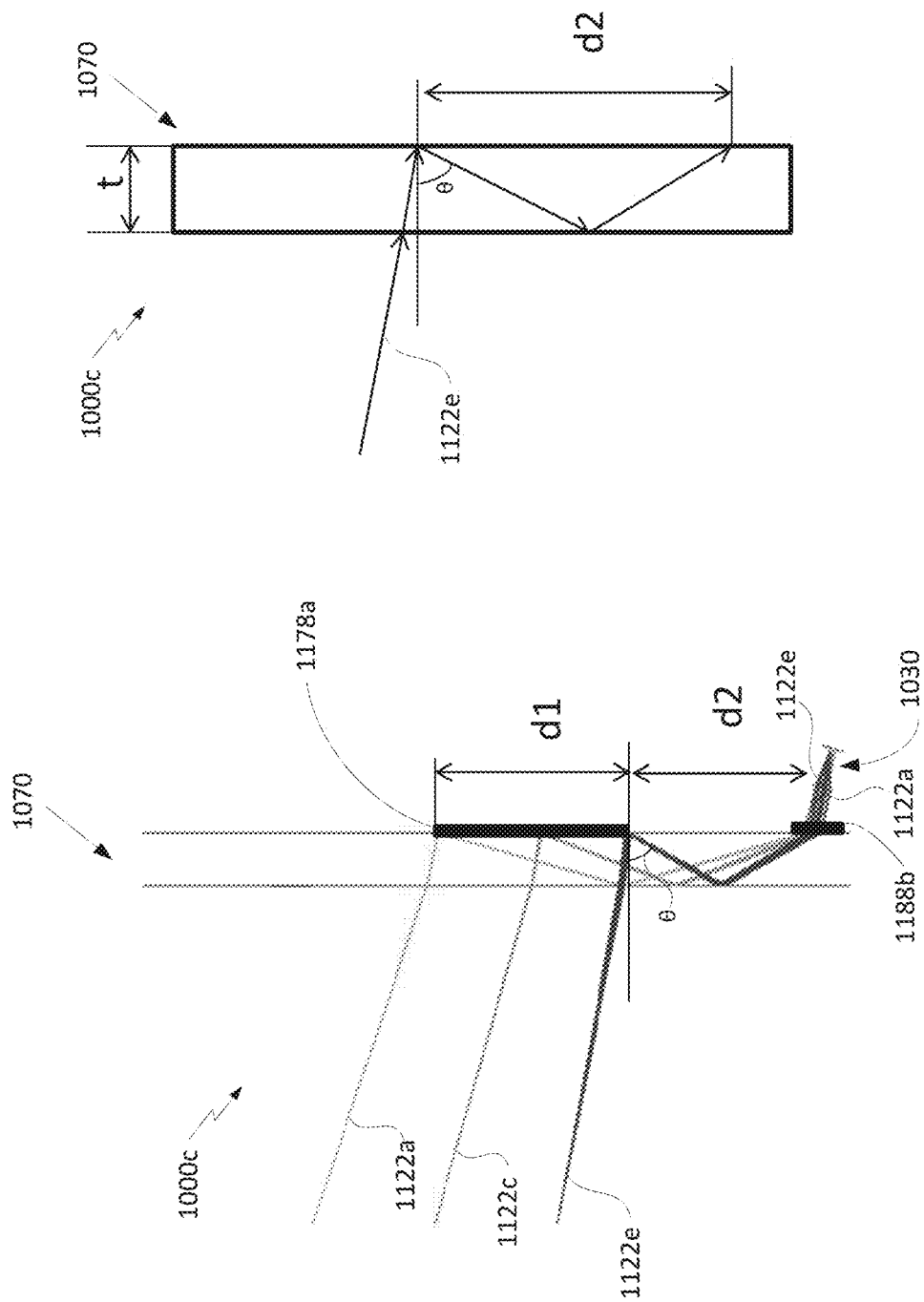
FIGS. 13A and 13B schematically illustrate another example imaging system comprising multiple coupling optical elements to totally internally reflect light from an object through a substrate to image the object at a camera assembly.

For example, FIGS. 13A and B schematically illustrate another view of the imaging system 1000c. FIGS. 13A and 13B illustrate example approach to reduce or eliminate the duplicative images 1212. Without subscribing to a particular scientific theory, the duplicative images 1212 may be reduced or substantially eliminated based on varying the thickness of the substrate 1070 (t), the size of the coupling optical elements 1178a ($d_1$), and the stride distance ($d_2$) of the light rays 1122. The stride distance ($d_2$) may refer to a distance parallel to the substrate 1070 that a light ray travels as it reflects within the substrate; that is, for example, the distance between two adjacent points of incidence on the distal surface 1076 of the substrate 1070 due to a single instance of total internal reflection. In some embodiments, the direct view image 1205 may also be reduced or removed, for example, by including a coating on the proximal or distal surface 1074, 1076 close to the object 1220 (e.g., an IR coating configured to block or reduce IR light from the object 1220).

For example, ghost images can be reduce or eliminated by reducing the size ($d_1$) of the coupling optical element 1178a to the smallest size and varying the physical arrangement of the components of the imaging system 1000c such that the stride distance ($d_2$) is greater than $d_1$.

In some embodiments, it may be desirable to control the stride distance (d2) to achieve a large stride distance while minimizing the size of the coupling optical element 1178a.

Without subscribing to a particular scientific theory, a large stride distance may reduce the intensity of ghost images or permit placement of the camera assembly 1030 outside of the stray light rays 1030. Thus, under some circumstances, the stride distance can be expressed as:

$$d_2 = 2*t*\tan(\theta) \qquad [2]$$

where θ is the diffraction angle of a light ray 1122 and t is the thickness of the substrate 1070. Increasing the stride distance may be done by increasing the thickness (t) of the substrate or increasing the diffractive angle (θ). As described above, the diffractive angle (θ) may be based on the spatial frequency or period of the diffractive features. For example, the lowest light ray 1122e has the smallest diffractive angle (θ), thus to increase the stride distance it may be preferable to increase this diffractive angle. Furthermore, increasing the thickness of the substrate 1070 may also increase the stride distance. However, it may be desirable to balance the thickness of the substrate 1070 against producing lightweight and compact imaging systems. In one embodiment, the substrate 1070 is a 2.5 millimeter thick piece of polycarbonate (other materials are possible) and the grating spatial frequency is 720 lines per millimeter. Various embodiments may include different substrate thicknesses or grating spatial frequencies.

FIGS. 14A and 14B schematically illustrate the examples of imaging systems with multiple coupling optical elements having an arrangement that is different than the imaging system 1000a of FIG. 11. As described in FIG. 11, the coupling optical elements are configured as either in- or out-coupling optical elements for inducing TIR and directing the light rays 1122 through the substrate 1070 to the camera assembly 1030. FIGS. 14A and 14B differ in the variation of the type and placement of the coupling optical elements.

For example, FIG. 14A depicts the imaging system 1000d that is substantially similar to the imaging system 1000b of FIG. 11. However, the imaging system 1000d comprises a transmissive coupling optical element 1178b disposed on the proximal surface 1074 of the substrate 1070 and a transmissive coupling optical element 1188b disposed on the distal surface 1076 of the substrate 1070. The transmissive coupling optical element 1178b may be configured as an in-coupling optical element that is transmissive to but diffracts the light 1122 of FIG. 11 at a diffraction angle to induce TIR at the distal surface 1046. The light 1122 may then be directed toward the transmissive coupling optical element 1188b configured as an out-coupling optical element, as described above in connection to FIG. 12A.

In the embodiment of FIG. 14B, the imaging system 1000e is substantially similar to the imaging system 1000b of FIG. 11. However, the imaging system 1000e comprises a transmissive coupling optical element 1178b and a reflective coupling optical element 1188a disposed on the proximal surface 1074 of the substrate 1070. The transmissive coupling optical element 1178b may be configured as an in-coupling optical element transmissive to but diffracts the light 1122 of FIG. 11 at a diffraction angle to induce TIR at the distal surface 1046. The light 1122 may then be directed toward the reflective coupling optical element 1188a configured as an out-coupling optical element, as described above in connection to FIG. 11.

Figure 15:
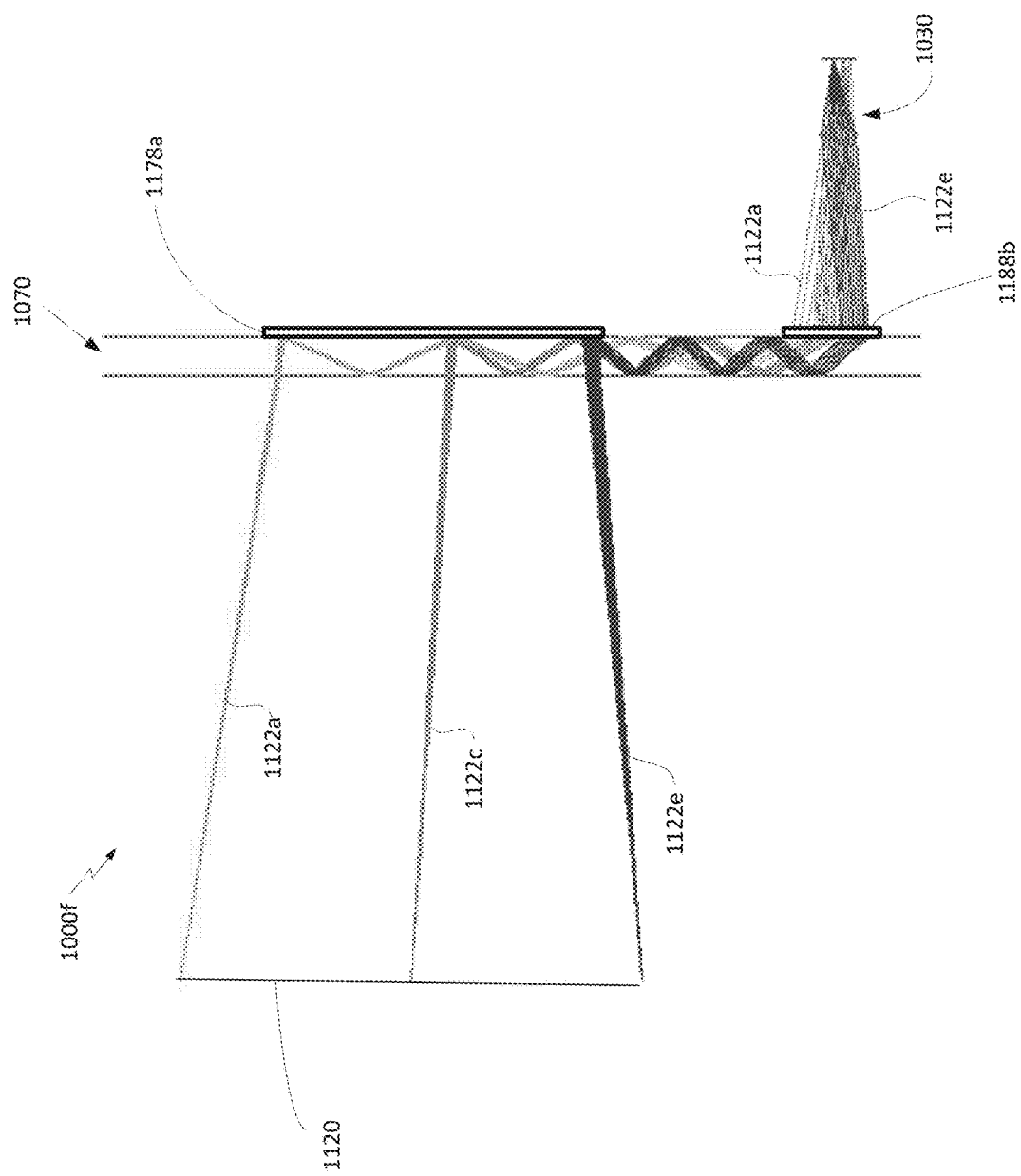

FIG. 15 schematically illustrates another example imaging system 1000f that is substantially similar to imaging system 1000c of FIGS. 12A-13B. Similar to the above imaging systems, FIG. 15 illustrates the imaging system 1000f comprising the reflective coupling optical element 1178a and the transmissive coupling optical element 1188b disposed on the distal surface 1076 of the substrate 1070. However, the coupling optical elements 1178a and 1188b comprise a spatial frequency of 1411.765 lines per millimeter and a pitch of 708.33 nanometers and the substrate is a 1 millimeter thick piece of polycarbonate. Accordingly, relative to the imaging system 1000c of FIGS. 12A-13B, the light 1122 may TIR multiple times within the substrate 1070 and the camera assembly may be shifted further away from the coupling optical element 1178a. Other configurations are possible.

Alternative Embodiments of Imaging Systems for Off-Axis Imaging

While FIG. 11 shows an example imaging system 1000b comprising the substrate 1070 having coupling optical elements 1178a, 1188a configured to TIR light from the object plane 1120 through the substrate 1070, other configurations are possible.

Figure 16:
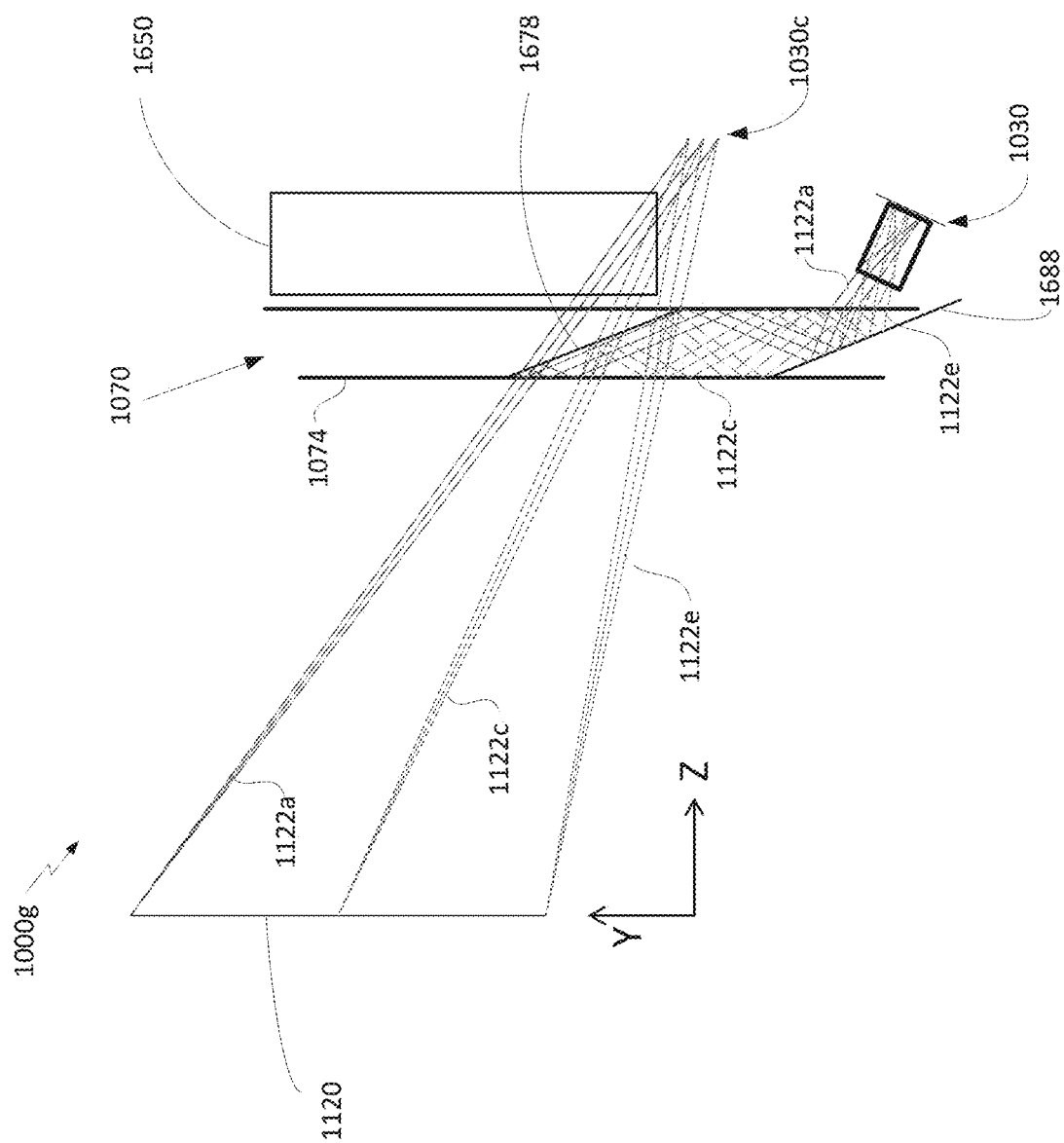

For example, FIG. 16 illustrates an imaging system 1000g comprising a substrate 1070 disposed adjacent to an optical component 1650. In some embodiments, the optical component 1650 may be the waveguide stack 260 of FIG. 6 or the waveguide stack 660 of FIGS. 9A-9C. While the substrate 1070 is illustrated as adjacent to and between the object 1120 and the optical component 1650, other configurations are possible. For example, the optical component 1650 may be between the substrate 1070 and the object 1120 or the substrate 1070 may be part of the optical component 1650. The substrate 1070 may comprise multiple reflective elements 1678 and 1688. As illustrated in FIG. 16, the light 1122 may travel from the object 1120 toward the substrate 1070 and interact with the proximal surface 1074. The light 1122 may be refracted and directed to reflective element 1678, which reflects the light 1122 at an angle such that the light TIRs on the proximal surface 1074. Thus, the light 1122 travels toward the reflective element 1688 via TIR. The light 1122 may be reflected by the reflective element 1688 toward the camera assembly 1030. Accordingly, the camera assembly 1030 may capture an off-axis image of the object 1120, as if the camera assembly 1030 was directly viewing the object 1120 (e.g., virtual camera assembly 1030c). In some embodiments, one or more of the reflective elements 1678, 1688 may be "hot mirrors" or comprise reflective coatings that are reflective in the IR while being transmissive in the visible spectrum.

In one embodiment of FIG. 16, the substrate 1070 is a 2 millimeter thick piece of polycarbonate and the proximal surface 1074 is positioned 15.7 millimeters to the right of the object plane 1120 (e.g., z-direction). The object plane 1120 is 12 millimeters vertically (e.g., y-direction). In some embodiments, the reflective element 1678 is configured to capture a substantially full FOV, where the central light ray 1122c propagates at 25 degrees down (e.g., negative y-direction) from normal. The camera assembly 1030 may be positioned 15.7 millimeters down from the origination of the light ray 1122c and 18.79 millimeters to the right. In this arrangement, the imaging system 1000g captures an image as if view from the virtual camera 1030c positioned 10.56 millimeters down and 22.65 millimeters to the right.

Figure 17:
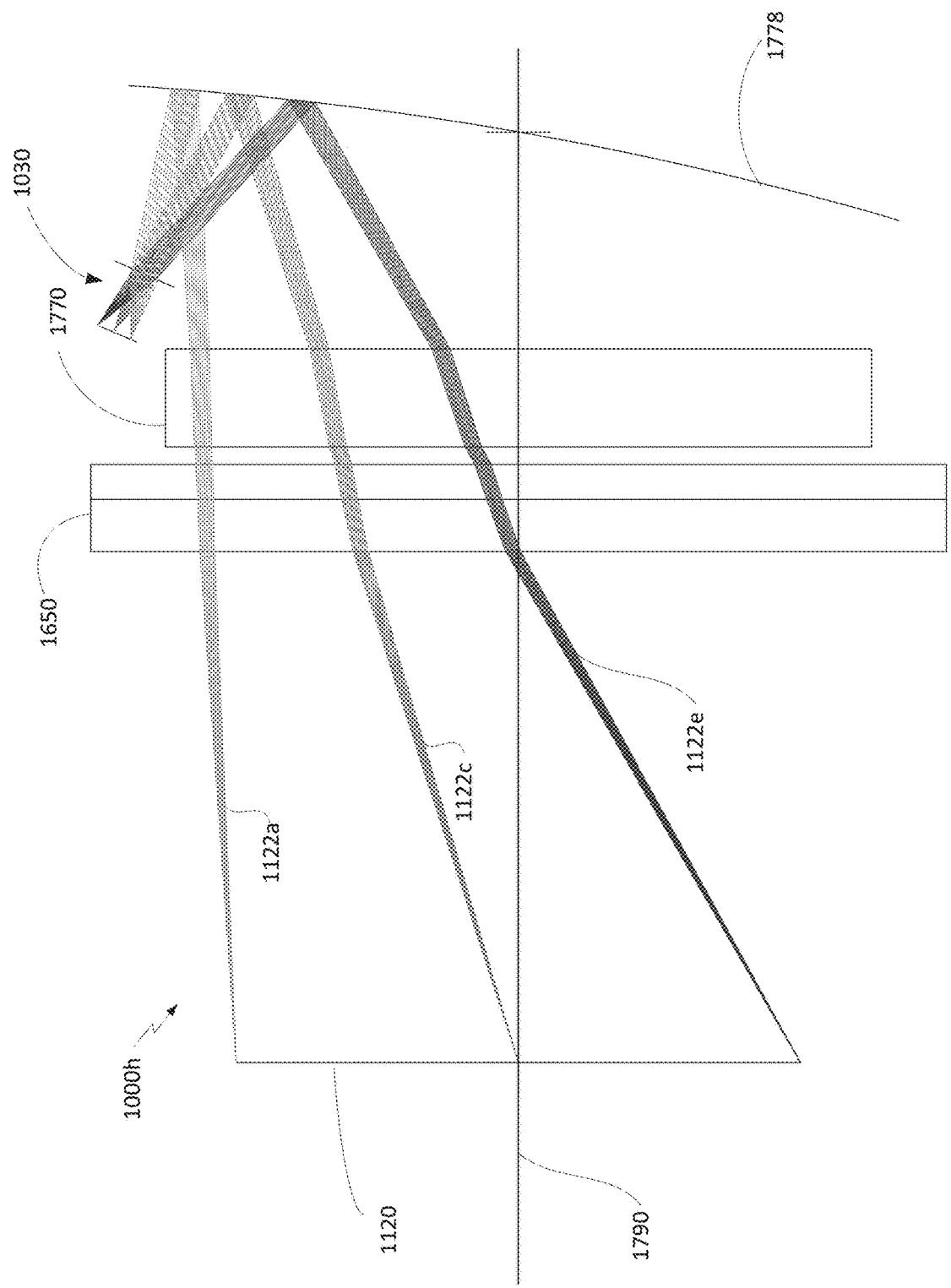

FIG. 17 illustrates an imaging system 1000h comprising a substrate 1770 disposed adjacent to an optical component 1650 (e.g., an optical cover-glass or a prescription glass), and a reflective surface 1778 disposed adjacent to the substrate 1770. In some embodiments, the substrate 1770 may be substantially similar to the substrate 1070 described above. While a specific arrangement is shown in FIG. 17, other configurations are possible. For example, the optical component 1650 may be between the substrate 1650 and the object 1120 or the substrate 1770 may be part of the optical component 1650. As illustrated in FIG. 17, the light 1122 may travel from the object 1120 toward the optical component 1650 and interact therewith. The light 1122 may then be refracted or pass through the optical component 1650 as it travels toward the substrate 1770. After passing through the substrate 1770 (refracted or passed through), the light 1122 is incident upon the reflective surface 1778. The reflective surface 1778 may have optical properties configured to reflect and direct the light 1122 toward the camera assembly 1030. Accordingly, the camera assembly 1030 may capture an off-axis image of the object 1120, as if the camera assembly 1030 was directly viewing the object 1120. In one embodiment of FIG. 17, the imaging system 1000f is configured to capture an object plane 1120 that is 16 millimeters by 24 millimeters, where the central light ray 1122c propagates at positive 17 degrees from normal (shown as line 1790).

In some embodiments the reflective surface 1778 may be a surface of a decorative or cosmetic lens or optical component. For example, a decorative lens may be a lens for use as sunglasses to filter out sunlight. In another embodiment, the decorative lens may be a color filtering lens for use in goggles. In yet other embodiments, the decorative lens may have a colored visual appearance that is viewable by other people who are not wearing the lens (e.g., a lens that appears blue, red, etc. to other people). The decorative lens may also include a color layer that is viewed by people other than the user. The reflective surface 1778 may be a reflective coating on the inside surface of the decorative lens. The reflective coating may be reflective in the IR while being transmissive in the visible spectrum so that the wearer is able to view the world. As shown in FIG. 17, the reflective surface 1778 may comprise a concave shape configured to direct the light 1122 toward the camera assembly 1030. However, other configurations are possible.

Figure 18:
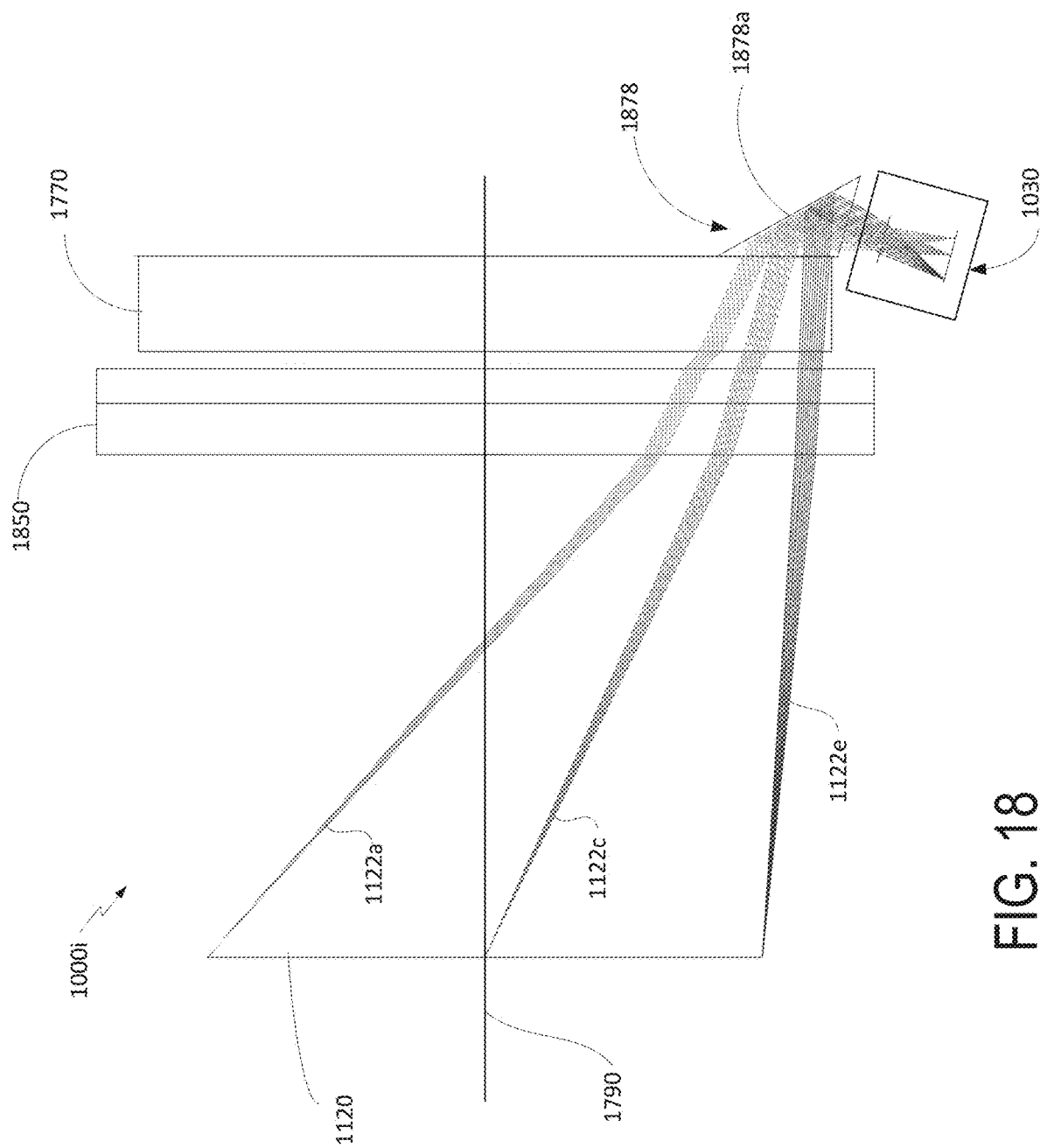

FIG. 18 illustrates an imaging system 1000i comprising a substrate 1770 disposed adjacent to an optical component 1850 and a prism 1878 disposed adjacent to the substrate 1770. In some embodiments, the substrate 1770 may be substantially similar to the substrate 1070 described above. The optical component 1850 may be substantially similar to optical component 1650, but may also comprise one or more of the exit pupil expanders 800, 810, 820 of FIGS. 9A-9C. While a specific arrangement is shown in FIG. 18, other configurations are possible. For example, the optical component 1850 may be between the substrate 1770 and the object 1120 or the substrate 1770 may be part of the optical component 1850. As illustrated in FIG. 18, the light 1122 may travel from the object 1120 toward the optical component 1850 and interact therewith. The light 1122 may be refracted or passed through as it travels toward the optical component 1850. After passing through the optical component 1850 (refracted or passed through), the light 1122 enters prism 1878 and is reflected by surface 1878a toward the camera assembly 1030. Accordingly, the camera assembly 1030 may capture an off-axis image of the object 1120, as if the camera assembly 1030 was directly viewing the object 1120. In some embodiments, the prism may be an IR prism, "hot mirror," or the surface 1878a may comprise reflective coatings that are reflective in the IR while being transmissive in the visible spectrum. In one embodiment of FIG. 18, the imaging system 1000i comprises a camera assembly 1030 having a vertical FOV of 35 degrees and a focal distance of 30.73 millimeters. Such an imaging system 1000i may be configured to capture an object plane 1120 that is 16 millimeters by 24 millimeters, where the central light ray 1122c propagates at negative 25 degrees from normal (shown as line 1790).

Example Routine for Imaging an Object

Figure 19:
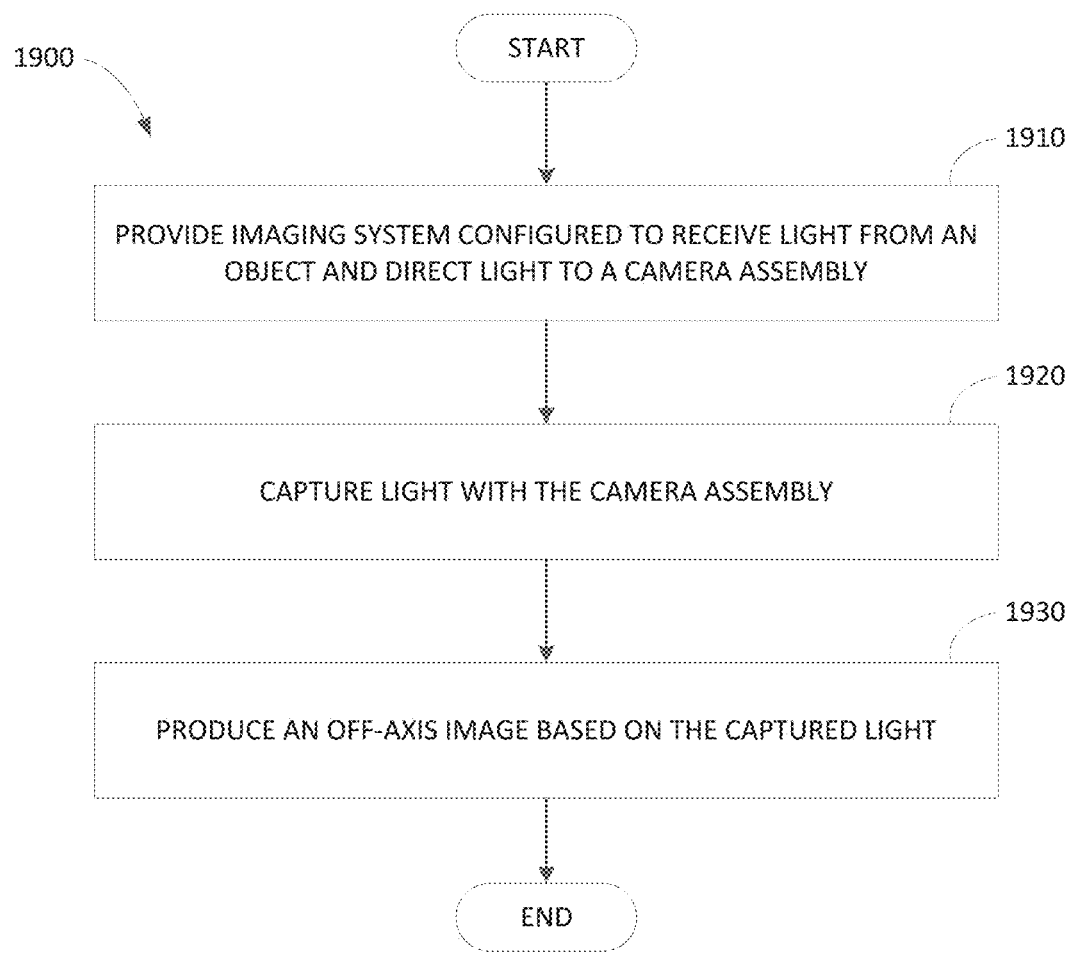
FIG. 19 is a process flow diagram of an example of a method for imaging an object using an off-axis camera.

FIG. 19 is a process flow diagram of an illustrative routine for imaging an object (e.g., an eye of the user) using an off-axis camera (e.g., camera assembly 630 of FIG. 6 or camera assembly 1030 of FIG. 10A). The routine 1900 describes how a light from an object can be can be directed to a camera assembly that is positioned away from or off-axis relative to the object for imaging the object as though the camera assembly was pointed directly toward the object.

At block 1910, an imaging system is provided that is configured to receive light from the object and direct the light to a camera assembly. The imaging system may be one or more of the imaging systems 1000a-i as described above in connection to FIGS. 10A-11, 12A, and 13A-18. For example, the imaging system may comprise a substrate (e.g., substrate 1070) comprising a first coupling optical element (e.g., first coupling optical element 1078, 1178a, or 1178b) and a second coupling optical element (e.g., second optical element 1188a or 1188b). The first and second optical elements may be disposed on a distal surface or a proximal surface of the substrate as described above and throughout this disclosure. The first and second optical elements may be laterally offset from each other along the substrate 1070. As described above and throughout this disclosure, the first coupling optical element may be configured to deflect light at an angle to TIR the light between the proximal and distal surfaces. The first optical element may be configured to deflect light at an angle generally toward the second coupling optical element. The second coupling optical element may be configured to receive the light from the first coupling optical element and deflect the light at an angle out of the substrate.

At block 1920, the light is captured with a camera assembly (e.g., camera assembly 630 of FIG. 6 or camera assembly 1030 of FIGS. 10A-11, 12A, and 13A-18). The camera assembly may be orientated toward the second coupling optical element and to receive the light deflected by the second coupling optical element. The camera assembly may be an off-axis camera in a forward facing or backward facing configuration. At block 1930, an off-axis image of the object may be produced based on the captured light, as described herein and throughout this disclosure.

In some embodiments, the routine 1900 may include an optional step (not shown) of illuminating the object with light from a light source (e.g., light source 632 of FIG. 6 or light source 1032 of FIGS. 10A-11, 12A, and 13A-18). In some embodiments, the light may comprise range of wavelengths including IR light.

In some embodiments, the off-axis image produced at block 1930 may be processed and analyzed, for example, using image-processing techniques. The analyzed off-axis image may be used to perform one or more of: eye tracking; biometric identification; multiscopic reconstruction of a shape of an eye; estimating an accommodation state of an eye; or imaging a retina, iris, other distinguishing pattern of an eye, and evaluate a physiological state of the user based, in part, on the analyzed off-axis image, as described above and throughout this disclosure.

In various embodiments, the routine 1900 may be performed by a hardware processor (e.g., the local processing and data module 140 of FIG. 2) configured to execute instructions stored in a memory. In other embodiments, a remote computing device (in network communication with the display apparatus) with computer-executable instructions can cause the display apparatus to perform aspects of the routine 1900.

Additional Aspects

1. An optical device comprising: a substrate having a proximal surface and a distal surface; a first coupling optical element disposed on one of the proximal surface and the distal surface; and a second coupling optical element disposed on one of the proximal surface and the distal surface and laterally offset from the first coupling optical element along a direction parallel to the proximal surface or the distal surface, wherein the first coupling optical element is configured to deflect light at an angle to totally internally reflect (TIR) the light between the proximal and distal surfaces and toward the second coupling optical element, the second coupling optical element configured to deflect light at an angle out of the substrate.

2. The optical device of Aspect 1, wherein the substrate is transparent to visible light.

3. The optical device of Aspect 1 or 2, wherein the substrate comprises a polymer.

4. The optical device of any one of Aspects 1-3, wherein the substrate comprises polycarbonate.

5. The optical device of any one of Aspects 1-4, wherein the first and second coupling optical elements are external to and fixed to at least one of the proximal and distal surfaces of the substrate.

6. The optical device of any one of Aspects 1-5, wherein the first and second coupling optical elements comprise a portion of the substrate.

7. The optical device of any one of Aspects 1-6, wherein at least one of the first and second coupling optical elements comprise a plurality of diffractive features.

8. The optical device of Aspect 7, wherein the plurality of diffractive features have a relatively high diffraction efficiency for a range of wavelengths so as to diffract substantially all of the light of the range of wavelengths.

9. The optical device of Aspect 7 or 8, wherein the plurality of diffractive features diffract light in at least one direction based in part on a period of the plurality of diffractive elements, wherein the at least one direction is selected to TIR the light between the proximal and distal surfaces.

10. The optical device of any one of Aspects 1-7, wherein at least one of the first or second coupling optical elements comprises at least one of an off-axis diffractive optical element (DOE), an off-axis diffraction grating, an off-axis diffractive optical element (DOE), an off-axis holographic mirror (OAHM), or an off-axis volumetric diffractive optical element (OAVDOE), or an off-axis cholesteric liquid crystal diffraction grating (OACLCG).

11. The optical device of any one of Aspects 1-7 and 10, wherein each of the first and second coupling optical elements are configured to deflect light of a first range of wavelengths while transmitting light of a second range of wavelengths.

12. The optical device of Aspect 11, wherein the first range of wavelengths comprises light in at least one of the infrared (IR) or near-IR spectrum and the second range of wavelengths comprises light in the visible spectrum.

13. The optical device of any one of Aspects 1, 7, and 11, wherein the first and second coupling optical elements selectively reflect light of a range of wavelengths, wherein the first coupling optical element is disposed on the distal surface of the substrate and the second coupling optical element is disposed on the proximal surface of the substrate.

14. The optical device of any one of Aspects 1, 7, 10, and 11, wherein the first and second coupling optical elements selectively transmit light of a range of wavelengths, wherein the first coupling optical element is disposed on the proximal surface of the substrate and the second coupling optical element is disposed on the distal surface of the substrate.

15. The optical device of any one of Aspects 1, 7, 10, and 11, wherein the first coupling optical element selectively reflects light of a range of wavelengths and the second coupling optical element selectively transmits light of the range of wavelengths, wherein the first and second coupling optical elements are disposed on the distal surface of the substrate.

16. The optical device of any one of Aspects 1, 7, 10, and 11, wherein the first coupling optical element selectively transmits light of a range of wavelengths and the second coupling optical element selectively reflects light of the range of wavelengths, wherein the first and second coupling optical elements are disposed on the proximal surface of the substrate.

17. A head mounted display (HMD) configured to be worn on a head of a user, the HMD comprising: a frame; a pair of optical elements supported by the frame such that each optical element of the pair of optical elements is capable of being disposed forward of an eye of the user; and an imaging system comprising: a camera assembly mounted to the frame; and an optical device in accordance to any one of the Aspects 1-16.

18. The HMD of Aspect 17, wherein at least one optical element of the pair of optical elements comprises the substrate.

19. The HMD of Aspect 17 or 18, wherein the substrate is disposed on a surface of at least one optical element of the pair of optical elements.

20. The HMD of any one of Aspects 17-19, wherein the frame comprises a pair of ear stems, and the camera assembly is mounted on one of the pair of ear stems.

21. The HMD of any one of Aspects 17-20, wherein the camera assembly is a forward facing camera assembly configured to image light received from the second coupling optical element.

22. The HMD of any one of Aspects 17-20, wherein the camera assembly is a backward facing camera assembly disposed in a direction facing toward the user, the backward facing camera assembly configured to image light received from the second coupling optical element.

23. The HMD of any one of Aspects 17-22, further comprising a light source emitting light of a first range of wavelengths toward at least one of: the eye of the user, a part of the eye, or a portion of tissue surrounding the eye.

24. The HMD of Aspect 23, wherein the light of the first range of wavelengths is reflected toward the first coupling optical element by at least one of: the eye of the user, a part of the eye, or a portion of tissue surrounding the eye.

25. The HMD of any one of Aspects 17-23, wherein each of the pair of optical elements is transparent to visible light.

26. The HMD of any one of Aspects 17-23 and 25, wherein each of the pair of optical elements is configured to display an image to the user.

27. The HMD of any one of Aspects 17-23, 25, and 26, wherein camera assembly is configured to image at least one of: the eye of the user, a part of the eye, or a portion of tissue surrounding the eye based, in part on, light received from the second coupling optical element.

28. The HMD of Aspect 27, wherein the HMD is configured to track the gaze of the user based on the image of the at least one of the: eye of the user, the part of the eye, or the portion of tissue surrounding the eye.

29. The HMD of Aspect 27, wherein the image imaged by the camera assembly is consistent with an image imaged by a camera placed in front of the eye of the user and directly viewing the at least one of the: eye of the user, the part of the eye, or the portion of tissue surrounding the eye.

30. The HMD of any one of Aspects 17-23, 25, and 27, wherein the optical device is arranged to reduce stray light received by the camera assembly.

31. The HMD of any one of Aspects 17-23, 25, 27, and 30, wherein a size of the first coupling optical element is less than a stride distance of the light reflected in the between the distal and proximal surfaces of the substrate, wherein the stride distance is based on a thickness of the substrate and the angle at which the first coupling optical element deflects the light.

32. The HMD of Aspect 31, wherein the size of the first coupling optical element is based on the field of view of the eye of the user.

33. The HMD of any one of Aspects 17-23, 25, 27, 30, and 31, wherein an image of the eye of the user imaged by the camera assembly and an image of the eye of the user imaged by a camera placed in front of the eye of the user are indistinguishable.

34. The HMD of any one of Aspects 17-23, 25, 27, 30, 31, and 33, further comprising: a non-transitory data storage configured to store imagery acquired by the camera assembly; and a hardware processor in communication with the non-transitory data storage, the hardware processor programmed with executable instructions to analyze the imagery, and perform one or more of: eye tracking; biometric identification; multiscopic reconstruction of a shape of an eye; estimating an accommodation state of an eye; or imaging a retina, iris, other distinguishing pattern of an eye, and evaluate a physiological state of the user.

35. An imaging system comprising: a substrate having a proximal surface and a distal surface, the substrate comprising: a first diffractive optical element disposed on one of the proximal surface and the distal surface; and a second diffractive optical element disposed on one of the proximal surface and the distal surface, the second diffractive optical element offset from the first diffractive optical element along a direction parallel to the proximal surface or the distal surface, wherein the first diffractive optical element is configured to deflect light at an angle to totally internally reflect (TIR) the light between the proximal and distal surfaces and toward the second coupling optical element, the second diffractive optical element configured to deflect light incident thereon at an angle out of the substrate; and a camera assembly to image the light deflected by the second diffractive optical element.

36. The imaging system of Aspect 35, wherein the first and second diffractive optical elements comprise at least one of an off-axis diffractive optical element (DOE), an off-axis diffraction grating, an off-axis diffractive optical element (DOE), an off-axis holographic mirror (OAHM), or an off-axis volumetric diffractive optical element (OAVDOE), an off-axis cholesteric liquid crystal diffraction grating (OA-CLCG), a hot mirror, a prism, or a surface of a decorative lens.

37. A method of imaging an object using a virtual camera, the method comprises: providing an imaging system in front of an object to be imaged, wherein the imaging system comprises: a substrate comprising a first coupling optical element and a second coupling optical element each disposed on one of a proximal surface and a distal surface of the substrate and offset from each other, wherein the first coupling optical element is configured to deflect light at an angle to totally internally reflect (TIR) the light between the proximal and distal surfaces and toward the second coupling optical element, the second coupling optical element configured to deflect the light at an angle out of the substrate; and capturing the light with a camera assembly oriented to receive light deflected by the second coupling optical element; and producing an off-axis image of the object based on the captured light.

38. The method of Aspect 37, wherein each of the first and second coupling optical elements deflect light of a first range of wavelengths while transmitting light in a second range of wavelengths.

39. The method of Aspect 37 or 38, further comprising illuminating the object with a first range of wavelengths emitted by a light source.

40. The method of any one of Aspects 37-39, further comprising: analyzing the off-axis image, and performing one or more of: eye tracking; biometric identification; multiscopic reconstruction of a shape of an eye; estimating an accommodation state of an eye; or imaging a retina, iris, other distinguishing pattern of an eye, and evaluate a physiological state of the user based, in part, on the analyzed off-axis image.

41. An imaging system comprising: a substrate having a proximal surface and a distal surface; a reflective optical element adjacent to the distal surface, wherein the reflective optical element is configured to reflect, at an angle, light that has passed out of the substrate at the distal surface; and a camera assembly to image the light reflected by the reflective optical element.

42. The imaging system of Aspect 41, wherein the reflective optical element comprises a surface of a decorative lens.

43. The imaging system of Aspect 41 or Aspect 42, wherein the reflective optical element comprises a reflective coating on a surface of a decorative lens.

44. The imaging system of any one of Aspects 41-43, wherein the reflective optical element comprises a reflective prism.

45. The imaging system of any one of Aspects 41-44, wherein the reflective optical element is reflective to infrared light and transmissive to visible light 46. The imaging system of any one of Aspects 41-45, further comprising a diffractive optical element adjacent to the proximal surface.

47. The imaging system of any one of Aspects 41-46, wherein the camera assembly is a forward facing camera assembly configured to image light received from the reflective optical element.

48. A head mounted display (HMD) configured to be worn on a head of a user, the HMD comprising: a frame; a pair of optical elements supported by the frame such that each optical element of the pair of optical elements is capable of being disposed forward of an eye of the user; and an imaging system in accordance with any one of Aspects 41-47.

49. The HMD of Aspect 48, wherein at least one optical element of the pair of optical elements comprises the substrate.

50. The HMD of Aspect 48 or 49, wherein the substrate is disposed on a surface of at least one optical element of the pair of optical elements.

51. The HMD of any one of Aspects 48-50, wherein the frame comprises a pair of ear stems, and the camera assembly is mounted on one of the pair of ear stems.

52. The HMD of any one of Aspects 48-51, further comprising a light source emitting light of a first range of wavelengths toward at least one of: the eye of the user, a part of the eye, or a portion of tissue surrounding the eye.

53. The HMD of Aspect any one of Aspects 48-52, wherein each of the pair of optical elements is transparent to visible light.

54. The HMD of any one of Aspects 48-53, wherein each of the pair of optical elements is configured to display an image to the user.

55. The HMD of any one of Aspects 48-54, wherein the camera assembly is configured to image at least one of: the eye of the user, a part of the eye, or a portion of tissue surrounding the eye based, in part on, light received from the second coupling optical element.

56. The HMD of any one of Aspects 48-55, wherein the HMD is configured to track the gaze of the user based on the image of the at least one of the: eye of the user, the part of the eye, or the portion of tissue surrounding the eye.

57. The HMD of any one of Aspects 48-56, wherein the image imaged by the camera assembly is consistent with an image imaged by a camera placed in front of the eye of the user and directly viewing the at least one of the: eye of the user, the part of the eye, or the portion of tissue surrounding the eye.

58. The HMD of any one of Aspects 48-57, wherein the optical device is arranged to reduce stray light received by the camera assembly.

59. The HMD of any one of Aspects 48-58, wherein an image of the eye of the user imaged by the camera assembly and an image of the eye of the user imaged by a camera placed in front of the eye of the user are indistinguishable.

60. The HMD of any one of Aspects 48-59, further comprising: a non-transitory data storage configured to store imagery acquired by the camera assembly; and a hardware processor in communication with the non-transitory data storage, the hardware processor programmed with executable instructions to analyze the imagery, and perform one or more of: eye tracking; biometric identification; multiscopic reconstruction of a shape of an eye; estimating an accommodation state of an eye; or imaging a retina, iris, other distinguishing pattern of an eye, and evaluate a physiological state of the user.

Additional Considerations

In the embodiments described above, the optical arrangements have been described in the context of eye-imaging display systems and, more particularly, augmented reality display systems. It will be understood, however, that the principles and advantages of the optical arrangements can be used for other head-mounted display, optical systems, apparatus, or methods. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including," "have" and "having" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Depending on the context, "coupled" or "connected" may refer to an optical coupling or optical connection such that light is coupled or connected from one optical element to another optical element. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items is an inclusive (rather than an exclusive) "or", and "or" covers all of the following interpretations of the word: any of the items in the list, all of the items in the list, and any combination of one or more of the items in the list, and does not exclude other items being added to the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. No element or combinations of elements is necessary or indispensable for all embodiments. All suitable combinations and subcombinations of features of this disclosure are intended to fall within the scope of this disclosure.

What is claimed is:

1. A head mounted display system, comprising:
a transparent eyepiece for projecting images from a light projector system to an eye of a user during operation of the head mounted display, the transparent eyepiece comprising a substrate configured to direct light from the light projector system to the user's eye;
a camera; and
an imaging assembly defining an object plane and an axis normal to the object plane at a central point of an object field of the imaging assembly, the imaging assembly configured to image the user's eye to the camera when the user's eye is positioned in the object field,
the imaging assembly comprising a reflective optical element arranged on an opposite side of the eyepiece from the user's eye, the reflective optical element being arranged to reflect light from the user's eye transmitted by the eyepiece towards the camera, the reflective optical element being positioned away from the axis.

2. The head mounted display system of claim 1, wherein a surface of the reflective optical element facing the substrate is concave.

3. The head mounted display system of claim 1, further comprising an optical component with an index of refraction different from an index of refraction of the substrate, wherein the optical component is configured to refract light from the user's eye into the substrate.

4. The head mounted display system of claim 3, wherein the optical component comprises an optical cover glass or a prescription glass.

5. The head mounted display system of claim 3, wherein the optical component contacts the substrate.

6. The head mounted display system of claim 1, wherein an axis of the reflective optical element is nonparallel to the axis of the of the imaging assembly.

7. The head mounted display system of claim 1, wherein the reflective optical element comprises a prism disposed on a world-side of the substrate.

8. The head mounted display system of claim 7, wherein the reflective optical element has zero optical power.

9. The head mounted display system of claim 8, wherein the reflective surface of the reflective optical element is angled at an acute angle relative to the axis.

10. The head mounted display system of claim 7, further comprising an optical component with an index of refraction different from an index of refraction of the substrate, wherein the optical component is configured to refract light from the user's eye into the substrate.

11. The head mounted display system of claim 10, wherein the optical component comprises exit pupil expanders.

12. The head mounted display system of claim 10, wherein the optical component comprises an optical cover glass or a prescription glass.

13. The head mounted display system of claim 1, wherein the substrate is a transparent waveguide.

14. The head mounted display system of claim 13, wherein the transparent waveguide comprises a polymer plastic material.

15. The head mounted display system of claim 1, wherein a surface of the reflective optical element facing the substrate is reflective in the infrared spectrum and transmissive in the visible spectrum.

16. The head mounted display system of claim 1, further comprising a light source configured to illuminate the user's eye.

17. The head mounted display system of claim 16, wherein the light source emits infrared light.

* * * * *